(12) United States Patent
Lei et al.

(10) Patent No.: US 10,081,757 B2
(45) Date of Patent: Sep. 25, 2018

(54) SHALE SWELLING INHIBITORS

(71) Applicant: ISP INVESTMENTS INC., Wilmington, DE (US)

(72) Inventors: Cuiyue Lei, Wayne, NJ (US); Osama M. Musa, Kinnelon, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 219 days.

(21) Appl. No.: 14/648,391

(22) PCT Filed: Nov. 22, 2013

(86) PCT No.: PCT/US2013/071477
§ 371 (c)(1),
(2) Date: May 29, 2015

(87) PCT Pub. No.: WO2014/088850
PCT Pub. Date: Jun. 12, 2014

(65) Prior Publication Data
US 2015/0344767 A1    Dec. 3, 2015

Related U.S. Application Data

(60) Provisional application No. 61/733,677, filed on Dec. 5, 2012.

(51) Int. Cl.
| C09K 8/528 | (2006.01) |
| C09K 8/68 | (2006.01) |
| C09K 8/52 | (2006.01) |
| C08B 11/20 | (2006.01) |
| C08B 15/00 | (2006.01) |
| C08B 31/12 | (2006.01) |
| C08B 37/00 | (2006.01) |
| C08B 37/02 | (2006.01) |
| C08B 37/08 | (2006.01) |
| C09K 8/035 | (2006.01) |
| C08F 299/00 | (2006.01) |
| C08L 29/04 | (2006.01) |
| C08L 33/06 | (2006.01) |
| C08L 33/26 | (2006.01) |

(52) U.S. Cl.
CPC ............ *C09K 8/52* (2013.01); *C08B 11/20* (2013.01); *C08B 15/00* (2013.01); *C08B 31/12* (2013.01); *C08B 37/003* (2013.01); *C08B 37/006* (2013.01); *C08B 37/0018* (2013.01); *C08B 37/0021* (2013.01); *C08B 37/0033* (2013.01); *C08B 37/0042* (2013.01); *C08B 37/0045* (2013.01); *C08B 37/0069* (2013.01); *C08B 37/0072* (2013.01); *C08B 37/0075* (2013.01); *C08B 37/0096* (2013.01); *C08F 299/00* (2013.01); *C08L 29/04* (2013.01); *C09K 8/035* (2013.01); *C08L 33/064* (2013.01); *C08L 33/066* (2013.01); *C08L 33/26* (2013.01); *C09K 2208/12* (2013.01)

(58) Field of Classification Search
CPC ....... C09K 8/035; C09K 8/52; C09K 2208/12
USPC ........................................... 507/224
See application file for complete search history.

(56) References Cited

U.S. PATENT DOCUMENTS

| 3,344,098 A * | 9/1967 | Horiguchi ............ C08F 291/00 430/108.22 |
| 4,330,441 A * | 5/1982 | Bohmer ................. C04B 24/38 106/697 |
| 2008/0154007 A1 | 6/2008 | Mori et al. |
| 2009/0192256 A1 | 7/2009 | Takeda et al. |
| 2010/0190947 A1 | 7/2010 | Hood et al. |

OTHER PUBLICATIONS

Technical data sheet of NATROSOL®, p. 4, Aqualon, 1999.*
International Search Report, PCT/US2013/071477 dated Jun. 12, 2014.

* cited by examiner

*Primary Examiner* — Aiqun Li
(74) *Attorney, Agent, or Firm* — Thompson Hine LLP; William J. Davis

(57) ABSTRACT

The present invention provides amidic polymers, which exhibit shale swelling inhibitor activity having improved biodegradability. The amidic polymers of the invention may be employed in a wide variety of compositions, particularly in subterranean drilling operations. Non-limiting generic structures of the amidic polymers are set out below: formula (1) wherein $R_1$-$R_3$ and integers m and n are defined herein.

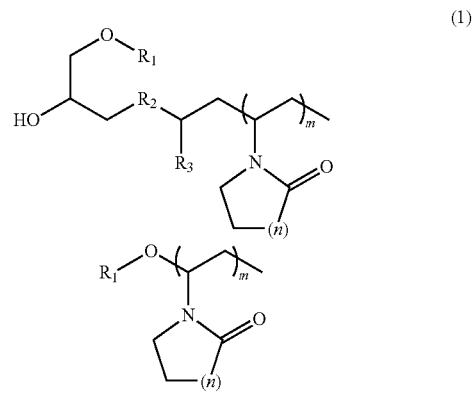

(1)

13 Claims, No Drawings

SHALE SWELLING INHIBITORS

CROSS-REFERENCE TO RELATED APPLICATIONS

This application is a national phase of PCT Application Number PCT/US2013/071477 filed Nov. 22, 2013 which claims priority from provisional Application No. 61/733,677 filed on Dec. 5, 2012 to which applicants claim the benefits of priority under 35 USC § 119(e) and 365, and which both applications are fully incorporated herein by reference.

BACKGROUND OF THE INVENTION

Field of the Invention

The present invention provides amidic polymers, which exhibit shale swelling inhibitor activity having improved biodegradability. The amidic polymers of the invention may be employed in a wide variety of compositions, particularly in subterranean drilling operations.

Description of Related Art

Subterranean drilling operations are procedures conducted below the surface of the earth from a formation such as in the course of recovering oil, gas, and other substances. Typically, rotary subterranean drilling operations involve attaching a drill bit on a lower end of a drill string to form a drilling tool and rotating the drill bit along with the drill string into a subterranean formation to create a well bore through which subsurface formation fluids may be recovered. During subterranean drilling operations, subterranean well bores may encounter strata having reactive shales. Reactive shales are materials like clays (bentonite) and other subterranean materials that swell when exposed to water. Reactive shales can cause problems during drilling because of their tendency to degrade when exposed to aqueous media such as aqueous-based drilling fluids. This degradation can result in undesirable drilling conditions because degradation of the shale may interfere with attempts to maintain the integrity of drilled cuttings traveling up the well bore until the cuttings can be removed by solids control equipment located at the surface. Degradation of drilled cuttings prior to their removal at the surface greatly prolongs drilling time because the shale particles traveling up the well bore break up into smaller particles. These smaller particles increasingly expose new surface area of the shale to the drilling fluid, which leads to still further absorption of water and further degradation.

Consequently, subterranean drilling operations generally employ drilling fluids to inhibit shale swelling and improve environmental performance. Drilling fluids used in such operations may be fluids (gaseous or liquid), mixtures of fluids, and solids (solid suspensions, emulsions, gases and solids). Drilling fluids are also used to cool the drill bit, lubricate the rotating drill, prevent blowouts, and remove drill cuttings from the well bore.

Shale disintegration may also affect Equivalent Circulating Density (ECD). ECD is the increase in bottom hole pressure due to friction and is normally expressed in pounds per gallon. ECD, when forward circulating, is the apparent fluid density, which results from adding annular friction to the actual fluid density in the well. ECD may be affected by the solids content of the drilling fluid, which may increase if surface solids control equipment cannot remove shale from the drilling fluid. Plastic viscosity (an indicator of size and quantity of solids) is an important parameter that affects drilling rate. Maintenance of appropriate ECD is important in drilling a well bore where a narrow tolerance exists between the weight of the drilling fluid needed to control the formation pressure and the weight of the drilling fluid that will fracture the formation. In such circumstances, minimizing shale degradation may be desirable to control the viscosity of the drilling fluid. Shale degradation may substantially decrease the stability of the well bore, which may cause irregularities in the diameter of the well bore. Shale degradation may decrease the stability of the well bore to such an extent that the well bore collapses. Degradation of the shale also may interrupt circulation of the drilling fluid, cause greater friction between the drill string and the well bore. Accordingly, the complications associated with shale swelling during drilling may substantially increase the time and cost of drilling.

Background material on shale swelling inhibitors include U.S. Pat. Nos. 7,087,554, 7,549,474, and 7,833,945. Further background includes A. V. Reis, et al., *J. Org. Chem.*, 2009, 74, 3750-3757; U.S. Pat. No. 5,037,930; S. H. Kim, et al., *Carbohydrate Polymers* 40 (1993) 180-190; and Fhilype J., et al., International *Journal of Pharmaceutices* 335 (2008) 184-194.

Traditional methods for inhibiting shale swelling during drilling have employed oil-based and synthetic-based drilling fluids. However, water-based shale swelling drilling inhibitors are now generally used because they are considered more environmentally friendly. Many shale swelling inhibitors show good inhibition performance in the oilfield but their application may be limited because of poor biodegradability. Accordingly, there is a need for shale swelling inhibitors having improved biodegradability.

SUMMARY OF THE INVENTION

The invention provides amidic polymers comprising a (a) polymer having a hydroxyl group reacted with a (b) compound having an epoxy group and an unsaturated moiety to provide a reactive unsaturated intermediate polymer; wherein the reactive unsaturated intermediate polymer is further reacted with a (c) vinyl amide to provide the amidic polymer.

The invention also provides amidic polymers comprising a (a) polymer having a hydroxyl group reacted with a (c) vinyl amide to provide the amidic polymer.

The invention also provides polymeric blends comprising a (a) polymer having a hydroxyl group and a (d) hydrophilic polymer having an amide group.

The invention further provides compositions comprising the amidic polymers and polymeric blends, wherein the compositions comprise adhesives, aerosols, agricultural compositions, beverages, biocides, cleaning compositions, coating compositions, cosmetic compositions, dental compositions, detergents, drugs, electronics, encapsulations, foods, hair gels, hair sprays, household-industrial-institutional, inks, lithographic solutions, membrane compositions, metal fluids, oilfield compositions, paints, paper, personal care compositions, pharmaceuticals, plasters, plastics, printing, and wood-care compositions.

DETAILED DESCRIPTION

The present invention provides amidic polymers and polymeric blends. The amidic polymers may be prepared by reacting: a polymer having a hydroxyl group, with a compound having an epoxy group and an unsaturated moiety, to provide a reactive unsaturated intermediate polymer. The reactive unsaturated intermediate polymer may then be further reacted with a vinyl amide to provide the amidic polymer. The amidic polymers may also be prepared by reacting: a polymer having a hydroxyl group, with a vinyl amide, to provide the amidic polymer. The polymeric blends may be prepared by blending: a polymer having a hydroxyl group, and a hydrophilic polymer having an amide group.

The amidic polymers and the polymeric blends exhibit improved shale swelling inhibitor activity and improved biodegradability. The amidic polymers and polymeric blends of the invention may be employed in a wide variety of compositions, particularly in subterranean drilling operations. The amidic polymers and polymeric blends may be employed singly or in mixtures, and may be formulated with other ingredients as necessary.

As used herein, the following terms have the meanings set out below.

The term "amidic polymer" refers to a polymer containing the —C(O)—NH— group. "Amidic" is the adjective form of amide (noun).

The term "anion" refers to an ion with more electrons than protons, giving it a net negative charge.

The term "branched and unbranched alkyl groups" refers to alkyl groups, which may be straight chained or branched. For example, the alkyl groups may have from 1 to about 18 carbon atoms, more particularly, from 1 to about 10 carbon atoms, and yet more particularly from 1 to about 6 carbon atoms. Branched groups include isopropyl, tert-butyl, and the like.

The term "cation" refers to an ion with fewer electrons than protons, giving it a net positive charge.

The term "compound having an epoxy group and an unsaturated moiety"; refers to, respectively, a compound having an epoxy group that contains a ring shaped group consisting of an oxygen atom bonded to two adjacent carbon atoms, each carbon atom bonded to each other; and to a compound having an unsaturated moiety that contains carbon to carbon double bonds or carbon to carbon triple bonds, preferably carbon to carbon double bonds.

The term "copolymer" refers to polymers polymerized from more than one type of monomer unit.

The term "generic substituent(s)" refer(s) to substituent(s) such as $R_1$-$R_3$, and integer subscripts used and defined in the invention.

The term "heteroatom" refers to atoms such as oxygen, nitrogen, sulfur, and phosphorous.

The term "hydrophilic" refers to a molecular entity that tends to be polar and capable of hydrogen bonding, thereby enabling it to be water-soluble or water-miscible.

The term "hydrophilic polymer having an amide group" refers to a polymer having an amide group, which has an affinity for water and tends to be water-soluble or partially water-soluble. Hydrophilic polymers typically have a portion of the molecule/polymer that is polar and capable of hydrogen bonding, thereby enabling it to be water-soluble or water-miscible. An amide group refers to the —C(O)—NH— group The term "monomer" refers to the repeat units comprising a polymer. A monomer is a small molecule that can chemically bond to other monomers to form a polymer.

The term "non-homopolymer" refers to a polymer formed from two or more monomers and includes essentially all polymers that are not homopolymers.

The term "polymer" refers to a large molecule (macromolecule) composed of repeating structural units (monomers) connected by covalent chemical bonds.

The term "polymer having a hydroxyl group" refers to a polymer containing the —OH group.

The term "polymeric blend" refers to a mixture of polymers. The particular blend may or may not have a synergistic effect on the particular physical or mechanical properties of the blend and the blend may or may not have inherent internal binding properties, such as hydrogen bonding.

The term "polymerization" refers to methods for chemically reacting monomer compounds to form polymer chains. The polymer chain may be alternating, block, or random. The type of polymerization method may be selected from a wide variety of methods. Such methods include, but are not limited to, free radical polymerization methods, such as classical radical polymerization and controlled radical polymerization, including, but not limited to Nitroxide Mediation Polymerization (NMP), Atom Transfer Radical Polymerization (ATRP), and Reversible Addition Fragmentation Chain-Transfer (RAFT).

The term "radical polymerization" or "free radical polymerization" refers to a method of polymerization by which a polymer is formed from the successive addition of free radical building blocks. Free radicals can be formed via a number of different mechanisms usually involving separate initiator molecules. Following creation of free radical monomer units, polymer chains grow rapidly with successive addition of building blocks onto free radical sites.

The term "reactive unsaturated intermediate polymer" refers to, respectively, a reactive polymer that is capable of having a chemical reaction or capable of chemically reacting; and to an intermediate polymer that is formed from reactants and reacts further to yield a desired product. The term "unsaturated" refers to a polymer that contains carbon to carbon double bonds or carbon to carbon triple bonds, preferably carbon to carbon double bonds.

The term "respectively" is a term that denotes that the items in a list correspond to each other in the order they are given. With reference to two or more items, the term refers in a parallel or sequential manner.

The term "shale" refers to materials such as certain types of clays (for example, bentonite) and related subterranean materials that may "swell," or increase in volume, when exposed to water.

The term "shale-inhibiting component" refers to a compound that demonstrates a propensity for inhibiting the tendency of shale to absorb water and thereby inhibit "swell," or increase in volume, when exposed to water.

The term "strata or stratum (plural)" refers to a layer of sedimentary rock or soil with internally consistent characteristics that distinguish it from other layers. Each layer is generally one of a number of parallel layers that lay one upon another, and are typically seen as bands of different colored or differently structured materials. Individual bands may vary in thickness and each band represents a specific mode of deposition: river silt, beach sand, coal swamp, sand dune, lava bed, etc.

The term "subterranean operation" refers to an operation that requires the performance of a procedure below the surface of the earth, including procedures performed in the course of recovering oil, gas, and other substances from a formation.

The term "vinyl amide" refers to a group of organic compounds containing the —CO—NH— amide group with an adjacent (conjugated) —$CH_2$=CH— vinyl group. Conjugation is the union of two groups. Conjugated systems are systems of connected electron orbitals with delocalized electrons in the compound with alternating single and multiple bonds. In general, the term "vinyl amide" refers to the structures:

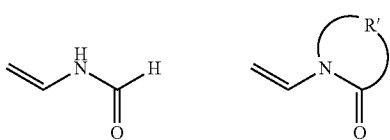

wherein the carbon atoms or nitrogen atom may be substituted.

The term "weight-average molecular weight" refers to a method of describing the molecular weight of a polymer. Polymer molecules, even if of the same type, come in different sizes (chain lengths, for linear polymers), so an average of some kind must be calculated. For the weight-average molecular weight, this is calculated by the equation:

$$\overline{M}w = \frac{\sum_i N_i M_i^2}{\sum_i N_i M_i}$$

where $N_i$ is the number of molecules of molecular weight $M_i$.

In one embodiment, the invention provides amidic polymers comprising a (a) polymer having a hydroxyl group reacted with a (b) compound having an epoxy group and an unsaturated moiety to provide a reactive unsaturated intermediate polymer; wherein the reactive unsaturated intermediate polymer is further reacted with a (c) vinyl amide to provide the amidic polymer.

In one aspect, the (a) polymer having a hydroxyl group is selected from the group consisting of partially and fully hydrolyzed poly(vinyl alcohol)s, polysaccharides, and mixtures thereof. Preferably, the polysaccharides are derived from celluloses, hydroxyethyl celluloses, carboxymethyl celluloses, hydroxyethyl celluloses, hydropropyl celluloses, hydroxypropyl methyl celluloses, ethyl celluloses, carageenans, chitosans, chondroitin sulfates, heparins, hyaluronic acids, starches, chitins, perctins, guars, xanthans, dextrans, welan gums, gellan gums, diutans, pullulana, and mixtures thereof.

In another aspect, the (b) compound having an epoxy group and an unsaturated moiety is selected from the group consisting of glycidyl methacrylates, glycidyl acrylates, glycidyl ethyl acrylates, allyl glycidyl ethers, glycidyl methacrylamides, glycidyl ethylacrylamides, glycidyl acrylamides, and mixtures thereof.

In another aspect, the (c) vinyl amide is selected from the group consisting of N-vinyl pyrrolidone; N-vinyl piperidone; N-vinyl caprolactam; N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl formamide; N-vinyl acetamide; N-(2,2-dichloro-vinyl)-propionamide; N-ethenyl acetamide; cis-N-propenyl acetamide; N-vinyl-N-methyl acetamide; N-vinyl-N,N-propyl propionamide; N-acryloyl piperidone; N-acryloyl pyrrolidone; ethyl acryloyl pyrrolidone; methyl acryloyl pyrrolidone; N-acryloyl caprolactam; ethyl acryloyl caprolactam; methyl acryloyl caprolactam; N-cyclohexylacrylamide; N-cyclopentylacrylamide; acrylamide, N-butoxymethylacrylamide; N,N-dibutylacrylamide; N-butylacrylamide; diacetoneacrylamide; N—(N,N-dimethylamino)ethyl acrylamide; N,N-diethylacrylamide; N,N-dimethylacrylamide; N-dodecylmethacrylamide; N-ethylacrylamide; N-ethylmethacrylamide; N-isopropylacrylamide; N-isopropylmethacrylamide; β,β-N,N-tetramethylacrylamide; N-methylolacrylamide; N-methyl acrylamide; N-octadecylacrylamide; N-octylacrylamide; N-phenylacrylamide; trichloroacrylamide; and mixtures thereof.

In another aspect, the amidic polymer is represented by the structure:

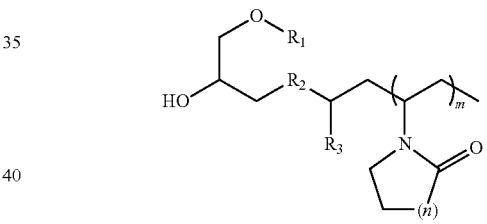

wherein $R_1$ is derived from a polymer having a hydroxyl group; $R_2$ is selected from the group consisting of —O—(C=O)—, —O—C—, and —NH—(C=O)—; $R_3$ is selected from the group consisting of hydrogen and $C_1$-$C_4$ alkyl groups; n is an integer ranging from 1-3; and m is an integer ranging from 1 to about 1,000,000.

In another aspect, $R_1$ is derived from a polymer having a hydroxyl group selected from the group consisting of partially and fully hydrolyzed poly(vinyl alcohol)s, polysaccharides, and mixtures thereof. Preferably the polysaccharides are derived from celluloses, hydroxyethyl celluloses, carboxymethyl celluloses, hydroxyethyl celluloses, hydropropyl celluloses, hydroxypropyl methyl celluloses, ethyl celluloses, carageenans, chitosans, chondroitin sulfates, heparins, hyaluronic acids, starches, chitins, perctins, guars, xanthans, dextrans, welan gums, gellan gums, diutans, pullulana, and mixtures thereof. Preferably $R_2$ is —O—(C=O)—; $R_3$ is hydrogen or methyl; n is an integer ranging from 1-2; and m is an integer ranging from about 1 to about 750,000.

In another aspect, the amidic polymer is selected from the group of structures consisting of:
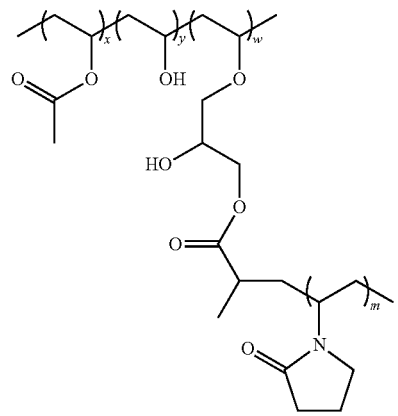
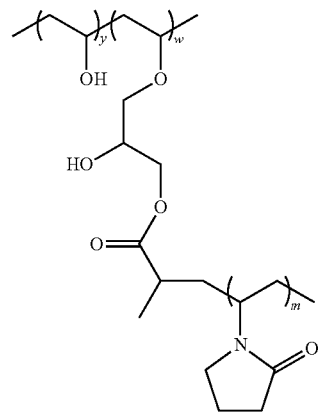
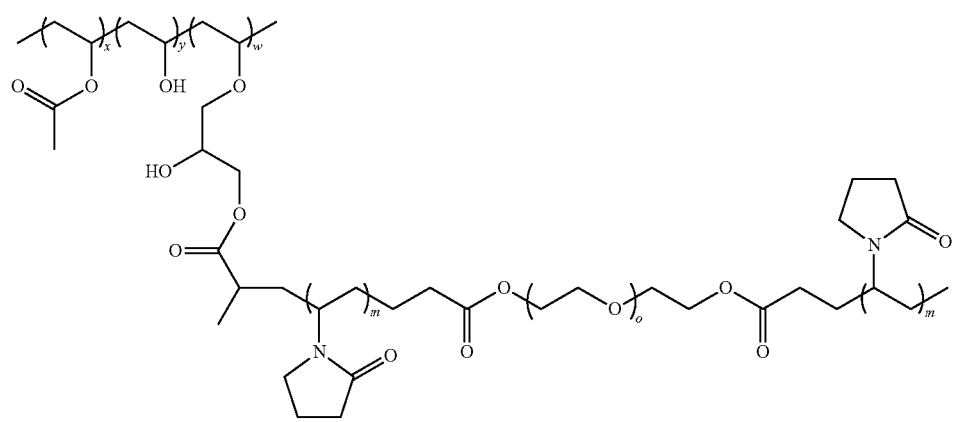
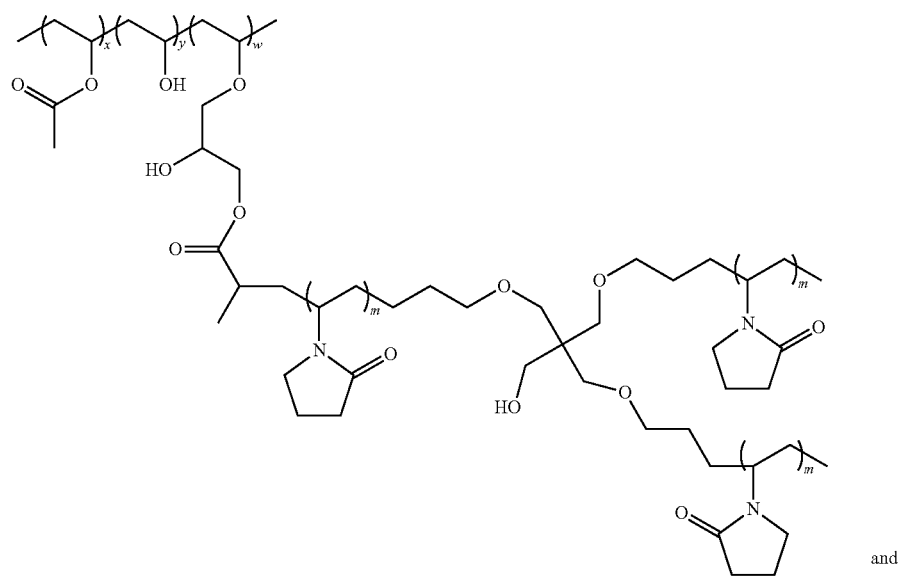
and -continued

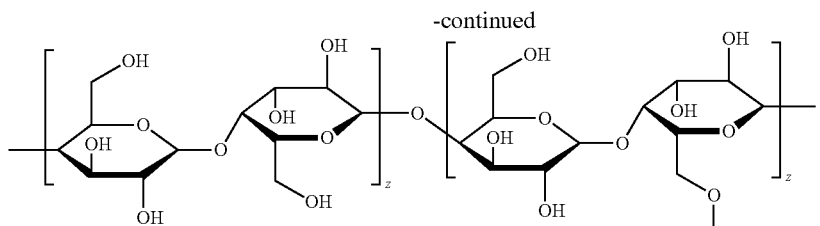
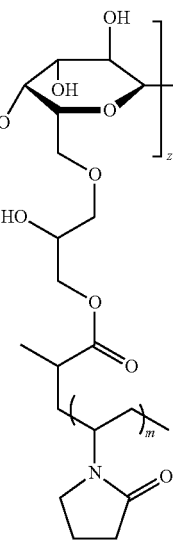

wherein x is an integer ranging from 1 to about 1,000,000; y is an integer ranging from 1 to about 1,000,000; w is an integer ranging from 1 to about 1,000,000; o is an integer ranging from 1 to about 1,000,000; and z is an integer ranging from 1 to about 1,000,000.

The weight-average molecular weight, as defined above, of the amidic polymer in this embodiment is from about 1,000 to about 10,000,000, preferably from about 10,000 to about 1,000,000, and more preferably from about 10,000 to about 600,000.

As set out above, the amidic polymers in this embodiment comprise a (a) polymer having a hydroxyl group reacted with a (b) compound having an epoxy group and an unsaturated moiety to provide a reactive unsaturated intermediate polymer; wherein the reactive unsaturated intermediate polymer is further reacted with a (c) vinyl amide to provide the amidic polymer.

The molecular weight of the (a) polymer having a hydroxyl group is from about 1,000 to about 1,000,000, preferably from about 1,000 to about 20,000.

The weight percent of the (a) polymer having a hydroxyl group is from about 1% to about 70%, preferably from about 1% to about 50%, and more preferably from about 5% to about 50%.

The weight percent of the (b) compound having an epoxy group and an unsaturated moiety is from about 0.1% to about 10%, preferably from about 0.5% to about 8%, and more preferably from about 1% to about 5%.

The weight percent of the (c) vinyl amide is from about 1% to about 98.9%, preferably from about 50% to about 98.9%, and more preferably from about 50% to about 70%.

The amidic polymers in this embodiment may be random, block, alternating, cross-linked, and branched.

The amidic polymers in this embodiment preferably comprise about (a) 40-50% partially hydrolyzed polyvinyl alcohol, about (b) 0.1-10% glycidyl methacrylate, and (c) about 50-60% vinyl pyrrolidone, by weight.

The unsaturated monomer may be hydrophilic or hydrophobic. Preferably, the amount of the unsaturated monomer in the amidic polymer enables the final amidic polymer to be water-soluble or water-dispersible. The (c) vinyl amide may further comprise a cross linker that can copolymerize with the (c) vinyl amide. The cross linker may contain multi-ethylenically unsaturated moieties, wherein the ethyleni-cally unsaturated moieties are vinyl or allyl, and blends thereof. The cross linker may be present in an amount of about 0.01-5%, preferably 0.01-2%, and more preferably 0.1-2%, by weight.

In another embodiment, the invention provides amidic polymers comprising a (a) polymer having a hydroxyl group reacted with a (c) vinyl amide to provide the amidic polymer.

In one aspect, the (a) polymer having a hydroxyl group is selected from the group consisting of partially and fully hydrolyzed poly(vinyl alcohol)s, polysaccharides, and mixtures thereof. Preferably, the polysaccharides are derived from celluloses, hydroxyethyl celluloses, carboxymethyl celluloses, hydroxyethyl celluloses, hydropropyl celluloses, hydroxypropyl methyl celluloses, ethyl celluloses, carageenans, chitosans, chondroitin sulfates, heparins, hyaluronic acids, starches, chitins, perctins, guars, xanthans, dextrans, welan gums, gellan gums, diutans, pullulana, and mixtures thereof.

In another aspect, the (c) vinyl amide is selected from the group consisting of N-vinyl pyrrolidone; N-vinyl piperidone; N-vinyl caprolactam; N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl formamide; N-vinyl acetamide; N-(2,2-dichloro-vinyl)-propionamide; N-ethenyl acetamide; cis-N-propenyl acetamide; N-vinyl-N-methyl acetamide; N-vinyl-N,N-propyl propionamide; N-acryloyl piperidone; N-acryloyl pyrrolidone; ethyl acryloyl pyrrolidone; methyl acryloyl pyrrolidone; N-acryloyl caprolactam; ethyl acryloyl caprolactam; methyl acryloyl caprolactam; N-cyclohexy-lacrylamide; N-cyclopentylacrylamide; acrylamide, N-butoxymethylacrylamide; N,N-dibutylacrylamide; N-buty-lacrylamide; diacetoneacrylamide; N—(N,N- dimethylamino)ethyl acrylamide; N,N-diethylacrylamide; N,N-dimethylacrylamide; N-dodecylmethacrylamide; N-ethylacrylamide; N-ethylmethacrylamide; N-isopropylacrylamide; N-isopropylmethacrylamide; β,β-N,N-tetramethylacrylamide; N-methylolacrylamide; N-methyl acrylamide; N-octadecylacrylamide; N-octylacrylamide; N-phenylacrylamide; trichloroacrylamide; and mixtures thereof.

In another aspect, the amidic polymer is represented by the structure:

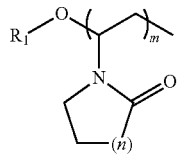

wherein $R_1$ is a polymer having a hydroxyl group; m is an integer ranging from about 1 to about 100,000; and n is an integer ranging from 1-3.

In another aspect, $R_1$ is derived from a polymer having a hydroxyl group selected from the group consisting of partially and fully hydrolyzed poly(vinyl alcohol)s, polysaccharides, and mixtures thereof. Preferably the polysaccharides are derived from celluloses, hydroxyethyl celluloses, carboxymethyl celluloses, hydroxyethyl celluloses, hydropropyl celluloses, hydroxypropyl methyl celluloses, ethyl celluloses, carageenans, chitosans, chondroitin sulfates, heparins, hyaluronic acids, starches, chitins, perctins, guars, xanthans, dextrans, welan gums, gellan gums, diutans, pullulana, and mixtures thereof. Preferably $R_2$ is —O—(C=O)—; $R_3$ is hydrogen or methyl; n is an integer ranging from 1-2; and m is an integer ranging from about 1 to about 750,000.

In another aspect, the amidic polymer is selected from the group of structures consisting of:

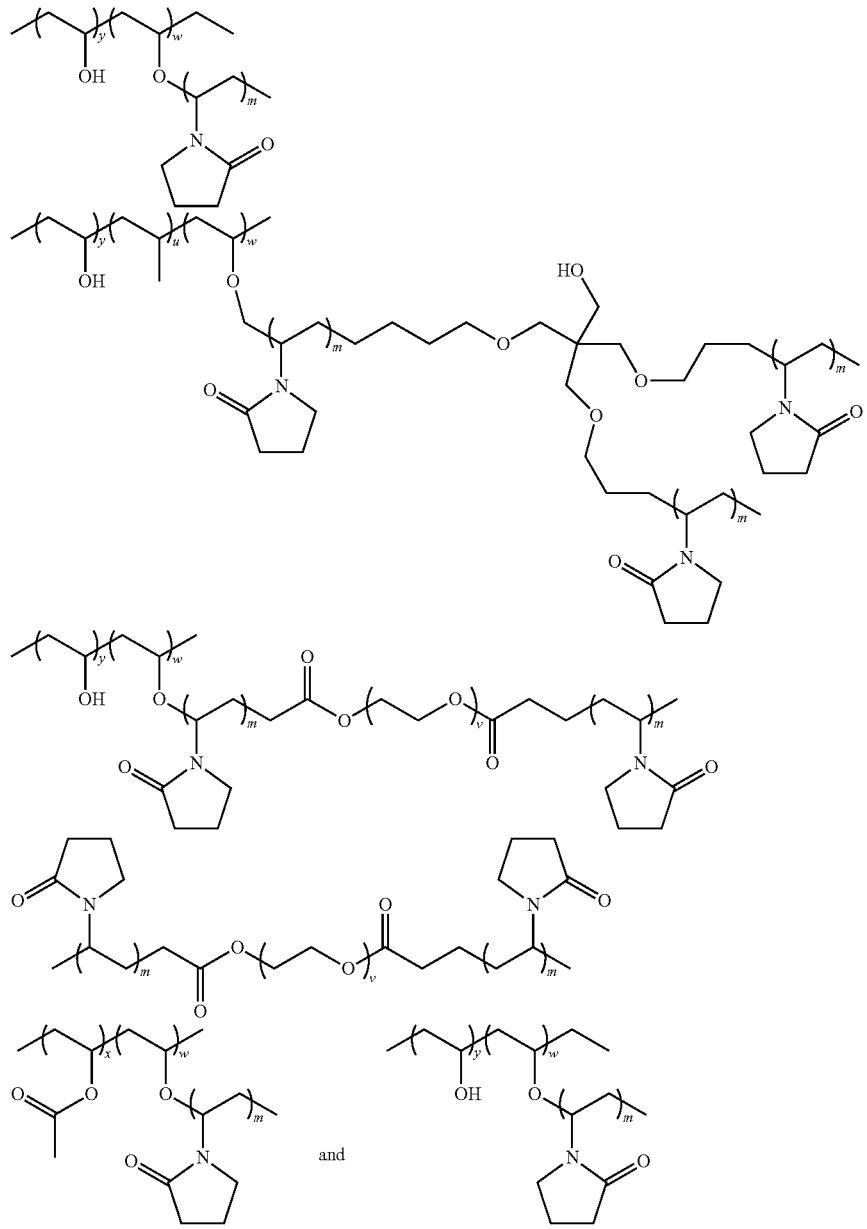

and wherein x is an integer ranging from 1 to about 1,000,000; y is an integer ranging from 1 to about 1,000,000; w is an integer ranging from 1 to about 1,000,000; and v is an integer ranging from 1 to about 1,000,000.

The weight-average molecular weight, as defined above, of the amidic polymer in this embodiment is from about 1,000 to about 10,000,000, preferably from about 10,000 to about 1,000,000, and more preferably from about 10,000 to about 600,000.

As set out above, the amidic polymers in this embodiment comprise a (a) polymer having a hydroxyl group reacted with a (c) vinyl amide to provide the amidic polymer.

The molecular weight of the (a) polymer having a hydroxyl group is from about 1,000 to about 1,000,000, preferably from about 1,000 to about 20,000.

The weight percent of the (a) polymer having a hydroxyl group is from about 1% to about 70%, preferably from about 1% to about 50%, and more preferably from about 5% to about 50%.

The weight percent of the (c) vinyl amide is from about 1% to about 98.9%, preferably from about 50% to about 98.9%, and more preferably from about 50% to about 70%.

The amidic polymers in this embodiment may be random, block, alternating, cross-linked, branched, and mixtures thereof.

The amidic polymers in this embodiment preferably comprise about (a) 40-50% polyvinyl alcohol, and (c) about 50-60% vinyl pyrrolidone, by weight. Preferably, the (a) polymer having a hydroxyl group is 85%-98% hydrolyzed polyvinyl alcohol, The unsaturated monomer may be hydrophilic or hydrophobic. Preferably, the final amidic polymer is water-soluble or water-dispersible. The (c) vinyl amide may further comprise a cross linker that can copolymerize with the (c) vinyl amide. The cross linker may contain multi-ethylenically unsaturated moieties, wherein the ethylenically unsaturated moieties are vinyl or allyl, and blends thereof. The cross linker may be present in an amount of about 0.01-5%, preferably 0.01-2%, and more preferably 0.1-2%, by weight.

In another embodiment, the invention provides polymeric blends comprising a (a) polymer having a hydroxyl group and a (d) hydrophilic polymer having an amide group.

In one aspect, the (a) polymer having a hydroxyl group is selected from the group consisting of partially hydrolyzed poly(vinyl alcohol)s, fully hydrolyzed polyvinyl alcohols, polysaccharides, and mixtures thereof. Preferably, the polysaccharides are derived from celluloses, hydroxyethyl celluloses, carboxymethyl celluloses, hydroxyethyl celluloses, hydropropyl celluloses, hydroxypropyl methyl celluloses, ethyl celluloses, carageenans, chitosans, chondroitin sulfates, heparins, hyaluronic acids, starches, chitins, perctins, guars, xanthans, dextrans, welan gums, gellan gums, diutans, pullulana, and mixtures thereof.

In another aspect, the (d) hydrophilic polymer having an amide group is selected from the group consisting of homo- and copolymers of polyvinylpyrrolidones, partially and fully hydrolyzed polyacrylamides, wherein the hydrophilic polymer may be a branched, cross-linked, or linear polymer, and mixtures thereof.

In another aspect, the blend is selected from the group consisting of:

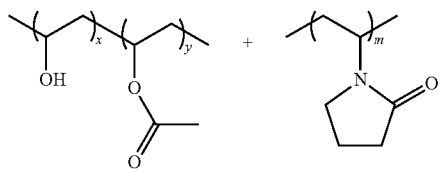

wherein x is an integer ranging from 1 to about 1,000,000; y is an integer ranging from 1 to about 1,000,000, and m is an integer ranging from 1 to about 100,000.

The weight-average molecular weight, as defined above, of the blends in this embodiment is from about 1,000 to about 10,000,000, preferably from about 10,000 to about 1,000,000, and more preferably from about 10,000 to about 600,000.

As set out above, the blends in this embodiment comprise a (a) polymer having a hydroxyl group and a (d) hydrophilic polymer having an amide group.

The blends in this embodiment may be random, block, alternating, cross-linked, and branched.

The blends may be hydrophilic or hydrophobic. Preferably, the final blends are water-soluble or water-dispersible.

When the amidic polymers and blends of the invention are used in drilling fluids, as shale-inhibiting agents, in subterranean formations, the drilling fluids may contain one or more salts in an aqueous-based composition. The selection of a particular salt and a particular aqueous-based composition will be subject to what is appropriate for a particular application as well as environmental considerations. Examples of suitable salts in drilling fluids include potassium chloride, sodium chloride, potassium formate, potassium carbonate, calcium chloride, calcium bromide, and mixtures thereof. The amount of salt present in the drilling fluid may be in an amount from about 5 pounds per barrel to about the salt saturation limit of the drilling fluid. The aqueous-based composition may be fresh water, salt water (water containing one or more dissolved salts), seawater (about 3.5% salinity), brine (saturated salt water), and mixtures thereof.

Other additives suitable for use in the drilling fluids include antifoaming agents, biocide agents, bridging agents, corrosion control agents, dispersant agents, flocculant agents, fluid loss additives, foaming agents, hydrogen sulfide ($H_2S$) scavengers, lubricating agents, oxygen scavengers, scale inhibitors, viscosifier agents, weighting agents, and mixtures thereof. The amount of additive present in the drilling fluid will be dependent upon the particular additive selected, the particular drilling fluid selected, and the particular application selected.

The amidic polymers and blends of the invention may be used in the drilling fluids in a shale-inhibiting amount. The exact amount of amidic polymers and blends present in the drilling fluids will depend upon the particular amidic polymers and blends selected, the particular application selected, cost effectiveness, environmental concerns, as well as many other factors.

In general, the methods of using a drilling fluid in a subterranean formation include providing a drilling fluid comprising an aqueous-based fluid and a shale-inhibiting agent; and placing the drilling fluid in a well bore in a subterranean formation. The methods also include providing a drilling fluid comprising an aqueous-based fluid and a shale-inhibiting agent; and placing the drilling fluid in a well bore in a subterranean formation, in contact with a drill bit and a subterranean formation. The methods further include providing a drilling fluid comprising an aqueous base fluid, a shale-inhibiting agent; and placing the drilling fluid in a subterranean formation. The shale-inhibiting agent may be added to the drilling fluid individually or as a pre-mixed additive that comprises the shale-inhibiting agent and optional components. The shale-inhibiting agents may be added to the drilling fluid prior to, during, or subsequent to placing the drilling fluid in the subterranean formation.

The methods of the present invention may be utilized in a variety of subterranean operations that involve subterranean drilling. Examples of suitable subterranean drilling operations include water well drilling, oil gas well drilling, utilities drilling, tunneling, constructional installation of subterranean pipelines, and service lines. These subterranean drilling operations may be utilized to drill a well bore in a subterranean formation, or to stimulate the production of fluids from a subterranean formation, as well as for other purposes.

Polymers of the invention may be used in a wide variety of compositions such as in adhesives, agricultural, biocides, coatings, electronics, household-industrial-institutional (HI&I), inks, membranes, metal fluids, oilfield, paper, paints, plastics, printing, plasters, and wood-care compositions.

Depending on the end application, one or more fillers may be included in the compositions and may be added for improved rheological properties and/or stress reduction. Examples of suitable nonconductive fillers include alumina, aluminum hydroxide, silica, fused silica, fumed silica, vermiculite, mica, wollastonite, calcium carbonate, titania, sand, glass, barium sulfate, zirconium, carbon black, organic fillers, and halogenated ethylene polymers, such as, tetrafluoroethylene, trifluoroethylene, vinylidene fluoride, vinyl fluoride, vinylidene chloride, and vinyl chloride. Examples of suitable conductive fillers include carbon black, graphite, gold, silver, copper, platinum, palladium, nickel, aluminum, silicon carbide, boron nitride, diamond, and alumina. Combinations of these fillers may be used.

The filler particles may be of any appropriate size, particularly from the nano to micro range. The choice of such size for any particular end use is within the expertise of one skilled in the art. The filler may be present in an amount from about 10% to about 90% by weight of the total composition. More than one filler type may be used in a composition and the fillers may or may not be surface treated. Appropriate filler sizes can be determined by the practitioner, and, in particular, may be within the range from about 20 nm to about 100 µm.

Other materials, such as adhesion promoters (e.g. epoxides, silanes), dyes, pigments, and rheology modifiers may be added as desired for the modification of the final properties. Such materials and the amounts needed are within the expertise of those skilled in the art.

Compositions belonging to the personal care/cosmetic and pharmaceutical arts find utility in altering, delivering an active, enhancing, improving, modifying the appearance, condition, color, health, style of the skin (including face, scalp, and lips), hair, nails, and oral cavity. Many examples and product forms of these compositions are known. These compositions can impart benefits that include, but are not limited to, hair style flexibility, hair style durability, humidity resistance for hair, color and/or color protection, moisturization, wrinkle reduction, protection from ultraviolet radiation, water proofness, water resistance, wear resistance, thermal protection, adhesion, active ingredient delivery, anti-cavity, and/or anti-gingivitis protection. As such, these compositions are sometimes categorized in the following areas: skin care, hair care (both styling and non-styling), sun care, cosmetics (including color cosmetics), antiperspirants, deodorants, oral hygiene, and men's and women's personal hygiene/grooming. In some cases these benefits and care areas overlap with another.

Skin care compositions include those materials used on the body, face, hands, lips, and/or scalp, and are beneficial for many reasons, such as firming, anti-cellulite, moisturizing, nourishing, cleaning, reducing or eliminating the appearance of wrinkles or lentigo, toning, and/or purifying. They also can be used to sanitize.

Consumers can identify many of the compositions that serve the sun care area, for example after-fun, children's, beach, self-tan, sports (i.e., being sweat proof, waterproof, resistant to running, or having added UV absorbers and/or antioxidants), sensitive skin products (i.e., having low irritation to the eyes and/or skin, and/or being free of fragrances and/or dyes), daily wear, leave-on hair creams, lotions, styling products, and hair sprays. Typically, sun care products also comprise one or more UV actives, which are those organic and inorganic materials that scatter, absorb, and/or reflect radiation having a wavelength from about 100 nm to about 400 nm. In one aspect, the sun care product protects against UV-A and/or UV-B radiation. UV-A radiation, from about 320 nm to about 400 nm, has the longest wavelength within the UV spectrum, and consequently is the least energetic. While UV-A rays can induce skin tanning, they are liable to induce adverse changes as well, especially in the case of sensitive skin or of skin, which is continually exposed to solar radiation. In particular UV-A rays cause a loss of skin elasticity and the appearance of wrinkles, leading to premature skin aging. UV-B rays have shorter wavelengths, from about 290 nm to about 320 nm, and their higher energy can cause erythema and skin burns, which may be harmful. Alternatively, sun care products may omit UV actives, and may be regarded as a tanning oil or a tan promoter. Some sun care compositions may promote soothe skin after sun exposure, and/or be formulated for application to the lips, hair, or the area around the eyes. Self-tan compositions, which are products that color skin without requiring full sun exposure, also fit under the sun care umbrella. The many different sun care product formats include may assume a consistency ranging from liquid to semiliquid forms (e.g., milks, creams), to thicker forms like gels, creams, pastes, and even solid- and wax-like forms. Sun care products also may take the form of an aerosol, spray, mist, roll-on, or wipe.

Hair care compositions include shampoos, leave-on and rinse-out conditioners used for conditioning, moisturizing, repairing, hair colors, hair relaxers, and deep conditioners and treatments such as hot oils and waxes, 2-in-1 shampoo/conditioner combination products, 3-in-1 shampoo/conditioner/styling agent. The many types of hair care products can be delivered in an array of formats, including aerosol sprays, pump sprays, gel sprays, mousses, gels, waxes, creams, pomades, spritzes, putties, lacquers, de-frizzing serums, perms, relaxants and colorants.

Color cosmetic compositions include facial make-up, eye makeup, mascaras, lip and nail products. Facial make-up compositions include foundation (liquid, solid, and semi-solid)—skin tinted creams, liquid, sticks, mousses used as a base under make-up, rouge, face powder, blusher, highlighters, face bronzers, concealers, and 2-way cake products.

Personal care/cosmetics also include eye make-up, mascaras, eyeliners, eye shadows, eyebrow pencils and eye pencils. Lip products include lipsticks, lip pencils, lip gloss, transparent bases and tinted lip moisturizers as well as multi-function color sticks that can also be used for cheeks and eyes. Nail products include nail varnishes/enamels, nail varnish removers, treatments, home-manicure products such as cuticle softeners and nail strengtheners.

In addition to the skin, hair, and sun care compositions summarized above, the polymers related herein also find application in oral care compositions. Non-limiting examples or oral care compositions include toothpastes (including toothpaste gels), denture adhesives, whiteners, anesthetics, and dental floss and related products. These compositions may take any product format, such as pastes, gels, creams, solutions, dispersions, rinses, flosses, aerosols, powders, and lozenges.

Grooming products for men and women include shaving products and toiletries, which may find use in preparing the skin and/or hair for dry or wet shaving. In addition, these compositions may help to moisturize, cool, and/or soothe skin. A variety of product forms are known, a few of which are foams, gels, creams, sticks, oils, solutions, tonics, balms, aerosols, mists, sprays, and wipes.

The polymer can also be used in other personal care/cosmetic applications, such as an absorbent material in appropriate applications such as diapers, incontinence products, feminine products, and other related products.

The polymers described herein also find application in bath and shower compositions, such as foams, gels, salts, oils, balls, liquids, powders and pearls. Also included are bar soaps, body washes, shower gels, cleansers, gels, oils, foams, scrubs and creams. As a natural extension of this category, these compositions also include liquid soaps and hand sanitizers used for cleaning hands.

The polymer of the invention can be used in combination with one or more additional personal care/cosmetically acceptable additives chosen from, for example, conditioning agents, protecting agents, such as, for example, hydrosoluble, liposoluble and water-insoluble UV filters, antiradical agents, antioxidants, vitamins and pro-vitamins, fixing agents, oxidizing agents, reducing agents, dyes, cleansing agents, anionic, cationic, nonionic and amphoteric surfactants, thickeners, perfumes, pearlizing agents, stabilizers, pH adjusters, filters, hydroxy acids, various cationic, anionic and nonionic polymers, cationic and nonionic polyether associative polyurethanes, preservatives, vegetable oils, mineral oils, synthetic oils, polyols such as glycols and glycerol, silicones, aliphatic alcohols, colorants, bleaching agents, highlighting agents and sequestrants.

These additives may be present in the composition according to the invention in proportions that may range from about 0% to about 20% by weight in relation to the total weight of the composition. An expert in the field according to its nature and its function may easily determine the precise amount of each additive.

Examples of these co-ingredients and many others can be found in the following references, each of which is herein incorporated in its entirety by reference: "Inventory and common nomenclature of ingredients employed in cosmetic products," *Official Journal of the European Union*, May 4, 2006, pages L 97/1 through L 97/528; and *International Cosmetic Ingredient Dictionary and Handbook*, 13$^{th}$ edition, ISBN: 1882621476, published by The Personal Care Products Council in January 2010.

Any known conditioning agent is useful in the personal care/cosmetic compositions of this invention. Conditioning agents function to improve the cosmetic properties of the hair, particularly softness, thickening, untangling, feel, and static electricity and may be in liquid, semi-solid, or solid form such as oils, waxes, or gums. Similarly, any known skin-altering agent is useful in the compositions of this invention. A few examples of conditioning agents include cationic polymers, cationic surfactants and cationic silicones. Conditioning agents may be chosen from synthesis oils, mineral oils, vegetable oils, fluorinated or perfluorinated oils, natural or synthetic waxes, silicones, cationic polymers, proteins and hydrolyzed proteins, ceramide type compounds, cationic surfactants, fatty amines, fatty acids and their derivatives, as well as mixtures of these different compounds.

The cationic polymers that may be used as a conditioning agent according to the invention are those known to improve the cosmetic properties of hair treated by detergent compositions. The expression "cationic polymer" as used herein, indicates any polymer containing cationic groups and/or ionizable groups in cationic groups. The cationic polymers used generally have a number-average molecular weight, which falls between about 500 and 5,000,000, for example between 1000 and 3,000,000. Cationic polymers may be chosen from among those containing units including primary, secondary, tertiary, and/or quaternary amine groups that may either form part of the main polymer chain or a side chain. Useful cationic polymers include known polyamine, polyaminoamide, and quaternary polyammonium types of polymers, such as:

homopolymers and copolymers derived from acrylic or methacrylic esters or amides. The copolymers can contain one or more units derived from acrylamides, methacrylamides, diacetone acrylamides, acrylic or methacrylic acids or their esters, vinyl lactams such as vinyl pyrrolidone or vinyl caprolactam, and vinyl esters. Specific examples include: copolymers of acrylamide and N,N-dimethylaminoethyl methacrylate quaternized with dimethyl sulfate or with an alkyl halide; copolymers of acrylamide and methacryloyloxyethyl trimethyl ammonium chloride; the copolymer of acrylamide and methacryloyloxyethyl trimethyl ammonium methosulfate; copolymers of vinyl pyrrolidone/dialkylaminoalkyl acrylate or methacrylate, optionally quaternized, such as the products sold under the name Gafquat® by Ashland Specialty Ingredients; the N,N-dimethylaminoethyl methacrylate/vinyl caprolactam/vinyl pyrrolidone terpolymers, such as the product sold under the name Gaffix® VC 713 by Ashland Specialty Ingredients; the vinyl pyrrolidone/methacrylamidopropyl dimethylamine copolymer, marketed under the name Styleze® CC-10 by Ashland Specialty Ingredients; the vinyl pyrrolidone/quaternized dimethyl amino propyl methacrylamide copolymers such as the product sold under the name Gafquat® HS-100 by Ashland Specialty Ingredients; and the vinyl pyrrolidone/dimethylaminopropyl methacrylamide/$C_9$-$C_{24}$ alkyldimethylaminopropyl methacrylic acid quaternized terpolymers described in U.S. Pat. No. 6,207,778 and marketed under the name Styleze® W-20 by Ashland Specialty Ingredients.

derivatives of cellulose ethers containing quaternary ammonium groups, such as hydroxyethyl cellulose quaternary ammonium that has reacted with an epoxide substituted by a trimethyl ammonium group.

derivatives of cationic cellulose such as cellulose copolymers or derivatives of cellulose grafted with a hydrosoluble quaternary ammonium monomer, as described in U.S. Pat. No. 4,131,576, such as the hydroxy alkyl cellulose, and the hydroxymethyl-, hydroxyethyl- or hydroxypropyl-cellulose grafted with a salt of meth-acryloyl ethyl trimethyl ammonium, methacrylamidopropyl trimethyl ammonium, or dimethyl diallyl ammonium.

cationic polysaccharides such as described in U.S. Pat. Nos. 3,589,578 and 4,031,307, guar gums containing cationic trialkyl ammonium groups and guar gums modified by a salt, e.g., chloride of 2,3-epoxy propyl trimethyl ammonium.

polymers composed of piperazinyl units and alkylene or hydroxy alkylene divalent radicals with straight or branched chains, possibly interrupted by atoms of oxygen, sulfur, nitrogen, or by aromatic or heterocyclic cycles, as well as the products of the oxidation and/or quaternization of such polymers.

water-soluble polyamino amides prepared by polycondensation of an acid compound with a polyamine. These polyamino amides may be reticulated.

derivatives of polyamino amides resulting from the condensation of polyalkylene polyamines with polycarboxylic acids followed by alkylation by bi-functional agents.

polymers obtained by reaction of a polyalkylene polyamine containing two primary amine groups and at least one secondary amine group with a dioxycarboxylic acid chosen from among diglycolic acid and saturated dicarboxylic aliphatic acids having 3 to 8 atoms of carbon. Such polymers are described in U.S. Pat. Nos. 3,227,615 and 2,961,347.

the cyclopolymers of alkyl dialyl amine or dialkyl diallyl ammonium such as the homopolymer of dimethyl diallyl ammonium chloride and copolymers of diallyl dimethyl ammonium chloride and acrylamide.

quaternary diammonium polymers such as hexadimethrine chloride. Polymers of this type are described particularly in U.S. Pat. Nos. 2,273,780, 2,375,853, 2,388,614, 2,454,547, 3,206,462, 2,261,002, 2,271, 378, 3,874,870, 4,001,432, 3,929,990, 3,966,904, 4,005,193, 4,025,617, 4,025,627, 4,025,653, 4,026, 945, and 4,027,020.

quaternary polyammonium polymers, including, for example, Mirapol® A 15, Mirapol® AD1, Mirapol® AZ1, and Mirapol® 175 products sold by Miranol.

the quaternary polymers of vinyl pyrrolidone and vinyl imidazole such as the products sold under the names Luviquat® FC 905, FC 550, and FC 370 by BASF.

quaternary polyamines.

reticulated polymers known in the art.

The conditioning agent can be a protein or hydrolyzed cationic or non-cationic protein. Examples of these compounds include hydrolyzed collagens having triethyl ammonium groups, hydrolyzed collagens having trimethyl ammonium and trimethyl stearyl ammonium chloride groups, hydrolyzed animal proteins having trimethyl benzyl ammonium groups (benzyltrimonium hydrolyzed animal protein), hydrolyzed proteins having groups of quaternary ammonium on the polypeptide chain, including at least one $C_1$-$C_{18}$ alkyl. Hydrolyzed proteins include Croquat™ L, in which the quaternary ammonium groups include a $C_{12}$ alkyl group, Croquat™ M, in which the quaternary ammonium groups include $C_{10}$-$C_{18}$ alkyl groups, Croquat™ S in which the quaternary ammonium groups include a $C_{18}$ alkyl group and Crotein Q in which the quaternary ammonium groups include at least one $C_1$-$C_{18}$ alkyl group. These products are sold by Croda. The conditioning agent can comprise quaternized vegetable proteins such as wheat, corn, or soy proteins such as cocodimonium hydrolyzed wheat protein, laurdimonium hydrolyzed wheat protein and steardimonium hydrolyzed wheat protein.

The conditioning agent can be a ceramide type of compound such as a ceramide, a glycoceramide, a pseudoceramide, or a neoceramide. These compounds can be natural or synthetic. Compounds of the ceramide type are, for example, described in Patents pending DE4424530, DE4424533, DE4402929, DE4420736, WO95/23807, WO94/07844, EP-A-0646572, WO95/16665, FR-2 673 179, EP-A-0227994, WO 94/07844, WO 94/24097, and WO 94/10131. Ceramide type compounds useful herein include 2-N-linoleoyl amino-octadecane-1,3-diol, 2-N-oleoyl amino-octadecane-1,3-diol, 2-N-palmitoyl amino-octadecane-1,3-diol, 2-N-stearoyl amino-octadecane-1,3-diol, 2-N-behenoyl amino-octadecane-1,3-diol, 2-N-[2-hydroxypalmitoyl]-amino-octadecane-1,3-diol, 2-N-stearoyl amino-octadecane-1,3,4-triol, N-stearoyl phytosphingosine, 2-N-palmitoyl amino-hexadecane-1,3-diol, bis-(N-hydroxy ethyl N-cetyl) malonamide, N(2-hydroxy ethyl)-N-(3-cetoxyl-2-hydroxy propyl) amide of cetylic acid, N-docosanoyl N-methyl-D-glucamine and mixtures of such compounds.

The conditioning agent can be a cationic surfactant such as a salt of a primary, secondary, or tertiary fatty amine, optionally polyoxyalkylenated, a quaternary ammonium salt, a derivative of imadazoline, or an amine oxide. Suitable examples include mono-, di-, or tri-alkyl quaternary ammonium compounds with a counter-ion such as a chloride, methosulfate, tosylate, etc. including, but not limited to, cetrimonium chloride, dicetyldimonium chloride, behentrimonium methosulfate, and the like. The presence of a quaternary ammonium compound in conjunction with the polymer described above reduces static and enhances combing of hair in the dry state. The polymer also enhances the deposition of the quaternary ammonium compound onto the hair substrate thus enhancing the conditioning effect of hair.

The conditioning agent can be any fatty amine known to be useful as a conditioning agent; e.g. dodecyl, cetyl or stearyl amines, such as stearamidopropyl dimethylamine. The conditioning agent can be a fatty acid or derivatives thereof known to be useful as conditioning agents. Suitable fatty acids include myristic acid, palmitic acid, stearic acid, behenic acid, oleic acid, linoleic acid, and isostearic acid. The derivatives of fatty acids include carboxylic esters including mono-, di-, tri- and tetra-carboxylic acids.

The conditioning agent can be a fluorinated or perfluorinated oil. Fluorinated oils include perfluoropolyethers described in EP-A-486135 and the fluorohydrocarbon compounds described in WO 93/11103. The fluoridated oils may also be fluorocarbons such as fluoramines, e.g., perfluorotributylamine, fluoridated hydrocarbons, such as perfluorodecahydronaphthalene, fluoroesters, and fluoroethers. Of course, mixtures of two or more conditioning agents can be used.

The conditioning agent can be any silicone known by those skilled in the art to be useful as a conditioning agent. The silicones suitable for use according to the invention include polyorganosiloxanes that are insoluble in the composition. The silicones may be present in the form of oils, waxes, polymers, or gums. They may be volatile or non-volatile. The silicones can be selected from polyalkyl siloxanes, polyaryl siloxanes, polyalkyl aryl siloxanes, silicone gums and polymers, and polyorgano siloxanes modified by organofunctional groups, and mixtures thereof. Suitable polyalkyl siloxanes include polydimethyl siloxanes with terminal trimethyl silyl groups or terminal dimethyl silanol groups (dimethiconol) and polyalkyl ($C_1$-$C_{20}$) siloxanes.

Suitable polyalkyl aryl siloxanes include polydimethyl methyl phenyl siloxanes and polydimethyl diphenyl siloxanes, linear or branched. The silicone gums suitable for use herein include polydiorganosiloxanes including those having a number-average molecular weight between 200,000 and 1,000,000, used alone or mixed with a solvent. Examples include polymethyl siloxane, polydimethyl siloxane/methyl vinyl siloxane gums, polydimethyl siloxane/diphenyl siloxane, polydimethyl siloxane/phenyl methyl siloxane and polydimethyl siloxane/diphenyl siloxane/methyl vinyl siloxane. Suitable silicone polymers include silicones with a dimethyl/trimethyl siloxane structure and polymers of the trimethyl siloxysilicate type. The organo-modified silicones suitable for use in the invention include silicones such as those previously defined and containing one or more organofunctional groups attached by means of a hydrocarbon radical and grafted siliconated polymers. In one embodiment the silicones are amino functional silicones. The silicones may be used in the form of emulsions, nano-emulsions, or micro-emulsions.

The conditioning agent or agents can be present in an amount from about 0.001% to about 20%, particularly from about 0.01% to about 10%, and even more particularly from about 0.1% to about 3% by weight based on the total weight of the final composition. The personal care/cosmetic compositions of the invention can contain one or more protecting agents in combination with the above-described polymer to prevent or limit the degrading effects of natural physical and/or chemical assaults on the keratinous materials.

The protecting agent can be chosen from hydrosoluble, liposoluble and water-insoluble UV filters, antiradical agents, antioxidants, vitamins and pro-vitamins. The above-described cationic polymer enhances the deposition of these materials onto the hair or skin substrate enhancing protection of hair to UV damage. Organic UV filters (systems that filter out UV rays) can be chosen from among hydrosoluble or liposoluble filters, whether siliconated or nonsiliconated, and mineral oxide particles, the surface of which may be treated. Hydrosoluble organic UV filters may be chosen from para-amino benzoic acid and its salts, anthranilic acid and its salts, salicylic acid and its salts, hydroxy cinnamic acid and its salts, sulfonic derivatives of benzothiazoles, benzimidizoles, benzoxazoles and their salts, sulfonic derivatives of benzophenone and their salts, sulfonic derivatives of benzylidene camphor and their salts, derivatives of benzylidene camphor substituted by a quaternary amine and their salts, derivatives of phthalydene-camphosulfonic acids and their salts, sulfonic derivatives of benzotriazole, and mixtures thereof. Hydrophilic polymers, which have light-protective qualities against UV rays, can be used. These include polymers containing benzylidene camphor and/or benzotriazole groups.

Suitable liposoluble organic UV filters include derivatives of para-aminobenzoic acid, such as the esters or amides of para-aminobenzoic acid; derivatives of salicylic acid; derivatives of benzophenone; derivatives of dibenzoyl methane; derivatives of diphenyl acrylates; derivatives of benzofurans; UV filter polymers containing one or more silico-organic residues; esters of cinnamic acid; derivatives of camphor; derivatives of trianilino-s-triazine; the ethylic ester urocanic acid; benzotriazoles; derivatives of hydroxy phenyl triazine; bis-resorcinol-dialkyl amino triazine; and mixtures thereof. The liposoluble (or lipophilic) organic UV filter can be chosen from octyl salicylate; 4-tert-butyl-4'-methoxy dibenzoyl methane; octocrylene; 4-methoxycinnamate; 2-ethylhexyl[2-ethylhexyl 4-methoxycinnamate]; and 2-(2H-benzotriazol-2-yl)-4-methyl-6-[2-methyl-3-[1,3,3,3-tetramethyl-1-[(trimethylsilyl)oxy]disiloxanyl]propynyl] phenol. Other UV filters that may be useful are derivatives of benzophenones such as 2-hydroxy-4-methoxy benzophenone-5-sulfonic acid, 2-hydroxy-4-methoxy benzophenone, derivatives of benzalmalonates such as poly dimethyl/methyl (3(4-(2,2-bis-ethoxy carbonyl vinyl)-phenoxy)-propenyl) siloxane, derivatives of benzylidene camphor such as b-b'camphosulfonic [1-4 divinylbenzene] acid and derivatives of benzimidazole such as 2-phenyl-benzimidazol-5-sulfonic acid. Water-insoluble UV filters include various mineral oxides. The mineral oxides may be selected from among titanium oxides, zinc oxides, and cerium oxides. The mineral oxides can be used in the form of ultrafine nanoparticles. For example, the UV filters can include Escalol® HP-610 (dimethylpabamido propyl laurdimonium tosylate and propylene glycol stearate) or Crodasorb HP (polyquaternium 59).

The antioxidants or antiradical agents can be selected from phenols such as BHA (tert-butyl-4-hydroxy anisole), BHT (2,6-di-tert-butyl-p-cresol), TBHQ (tert-butyl hydroquinone), polyphenols such as proanthocyanodic oligomers, flavonoids, hindered amines such as tetra amino piperidine, erythorbic acid, polyamines such as spermine, cysteine, glutathione, superoxide dismutase, and lactoferrin.

The vitamins can be selected from ascorbic acid (vitamin C), vitamin E, vitamin E acetate, vitamin E phosphate, B vitamins such as B3 and B5, vitamin PP, vitamin A, and derivatives thereof. The provitamins can be selected from panthenol and retinol.

The protecting agent can be present in an amount from about 0.001% to about 20% by weight, particularly from about 0.01% to about 10% by weight, and more particularly from 0.1% to about 5% by weight of the total weight of the final composition.

The composition of the invention can contain a fixing agent in combination with the above-described polymer. The fixing agent can be an anionic polymer chosen from polymers containing carboxylic units derived from unsaturated carboxylic mono- or polyacids.

The fixing agent can be an amphoteric polymer chosen from the polymer containing recurring units derived from:
at least one comonomer containing carboxylic acid units, and
at least one basic comonomer, such as esters with primary, secondary, tertiary, and quaternary amino substituents of acrylic and methacrylic acids and the product of quaternization of dimethylaminoethyl methacrylate with dimethyl or diethyl sulfate.

The fixing agent can be a nonionic polymer chosen from polyalkyloxazolines; vinyl acetate homopolymers; vinyl acetate and acrylic ester copolymers; vinyl acetate and ethylene copolymers; vinyl acetate and maleic ester copolymers; polyethylene and maleic anhydride copolymers; homopolymers of alkyl acrylates; homopolymers of alkyl methacrylates; copolymers of acrylic esters; copolymers of alkyl acrylates and alkyl methacrylates; copolymers of acrylonitrile and a nonionic monomer chosen from among butadiene and alkyl(meth)acrylates; copolymers of alkyl acrylate and urethane; and polyamides. The fixing agent can be a functionalized or unfunctionalized, silicone or nonsilicone polyurethane. The fixing polymer can be a polymer of the grafted silicone type containing a polysiloxane portion and a portion consisting of a nonsilicone organic chain, with one of the two portions forming the main chain of the polymer, and with the other being grafted onto the main chain.

The fixing agent can be present in the composition in a relative weight concentration between about 0.1% to about 10%, for example, from about 0.5% to about 5%.

The personal care/cosmetic composition of the invention can contain an oxidizing agent in combination with the above-described polymer. The oxidizing agent can be chosen from the group of hydrogen peroxide, urea peroxide, alkali metal bromates, ferricyanides, persalts, and redox enzymes, optionally with their respective donor or cofactor. For example, the oxidizing agent can be hydrogen peroxide. The oxidizing agent can be a solution of oxygenated water whose titer varies from 1 to 40 volumes.

The personal care/cosmetic composition of the invention can contain at least one reducing agent in combination with the above-described polymer in amounts from about 0.01% to about 30%, particularly from about 0.05% to about 20% of the total weight of the composition. The reducing agents can be selected from thiols, like cysteine, thioglycolic acid, thiolactic acid, their salts and esters, cysteamine, and its salts or sulfites. In the case of compositions intended for bleaching, ascorbic acid, its salts and its esters, erythorbic acid, its salts and its esters, and sulfinates, like sodium hydroxymethanesulfinate can be used.

The personal care/cosmetic composition of the invention can contain a dye in combination with the above-described polymer. The dye can be selected from the group consisting of neutral acid or cationic nitrobenzene dyes, neutral acid or cationic azo dyes, quinone dyes, neutral, acid or cationic anthraquinone dyes, azine dyes, triarylmethane dyes, indoamine dyes and natural dyes. The dye or dyes can be present in a concentration from about 0.001% to about 20%, and particularly from about 0.005% to about 10% based on the total weight of the composition.

In addition, the personal care/cosmetic compositions can include at least one surfactant in combination with the above-described polymer. The surfactant can be present in an amount from about 0.1% to about 60%, particularly from about 1% to about 40%, and more particularly from about 5% to about 30% by weight based on the total weight of the composition. The surfactant may be chosen from among anionic, amphoteric, or non-ionic surfactants, or mixtures of them known to be useful in personal care/cosmetic compositions.

One or more suitable thickeners or viscosity increasing agents may be included in combination with the above-described polymer in the personal care/cosmetic compositions of the invention. Suitable thickeners and/or viscosity increasing agents include: Acetamide MEA; Acrylamide/Ethalkonium Chloride Acrylate Copolymer; Acrylamide/Ethyltrimonium Chloride Acrylate/Ethalkonium Chloride Acrylate Copolymer; Acrylamides Copolymer; Acrylamide/Sodium Acrylate Copolymer; Acrylamide/Sodium Acryloyldimethyltaurate Copolymer; Acrylates/Acetoacetoxyethyl Methacrylate Copolymer; Acrylates/Beheneth-25 Methacrylate Copolymer; Acrylates/C10-30 Alkyl Acrylate Crosspolymer; Acrylates/Ceteth-20 Itaconate Copolymer; Acrylates/Ceteth-20 Methacrylate Copolymer; Acrylates/Laureth-25 Methacrylate Copolymer; Acrylates/Palmeth-25 Acrylate Copolymer; Acrylates/Palmeth-25 Itaconate Copolymer; Acrylates/Steareth-50 Acrylate Copolymer; Acrylates/Steareth-20 Itaconate Copolymer; Acrylates/Steareth-20 Methacrylate Copolymer; Acrylates/Stearyl Methacrylate Copolymer; Acrylates/Vinyl Isodecanoate Crosspolymer; Acrylic Acid/Acrylonitrogens Copolymer; Adipic Acid/Methyl DEA Crosspolymer; Agar; Agarose; *Alcaligenes* Polysaccharides; Algin; Alginic Acid; Almondamide DEA; Almondamidopropyl Betaine; Aluminum/Magnesium Hydroxide Stearate; Ammonium Acrylates/Acrylonitrogens Copolymer; Ammonium Acrylates Copolymer; Ammonium Acryloyldimethyltaurate/Vinyl Formamide Copolymer; Ammonium Acryloyldimethyltaurate/VP Copolymer; Ammonium Alginate, Ammonium Chloride; Ammonium Polyacryloyldimethyl Taurate; Ammonium Sulfate; Amylopectin; Apricotamide DEA; Apricotamidopropyl Betaine; Arachidyl Alcohol; Arachidyl Glycol; *Arachis Hypogaea* (Peanut) Flour; Ascorbyl Methylsilanol Pectinate; Astragalus Gummifer Gum; Attapulgite; *Avena Sativa* (Oat) Kernel Flour; Avocadamide DEA; Avocadamidopropyl Betaine, Azelamide MEA; Babassuamide DEA; Babassuamide MEA; Babassuamidopropyl Betaine; Behenamide DEA; Behenamide MEA, Behenamidopropyl Betaine; Behenyl Betaine; Bentonite; Butoxy Chitosan, *Caesalpinia Spinosa* Gum; Calcium Alginate; Calcium Carboxymethyl Cellulose; Calcium Carrageenan; Calcium Chloride; Calcium Potassium Carbomer; Calcium Starch Octenylsuccinate; C20-40 Alkyl Stearate; Canolamidopropyl Betaine; Capramide DEA; Capryl/Capramidopropyl Betaine; Carbomer; Carboxybutyl Chitosan; Carboxymethyl Cellulose Acetate Butyrate; Carboxymethyl Chitin; Carboxymethyl Chitosan; Carboxymethyl Dextran; Carboxymethyl Hydroxyethylcellulose; Carboxymethyl Hydroxypropyl Guar; Carnitine; Cellulose Acetate Propionate Carboxylate; Cellulose Gum; *Ceratonia Siliqua* Gum; Cetearyl Alcohol; Cetyl Alcohol; Cetyl Babassuate; Cetyl Betaine; Cetyl Glycol; Cetyl Hydroxyethylcellulose; Chimyl Alcohol; Cholesterol/HDI/Pullulan Copolymer; Cholesteryl Hexyl Dicarbamate Pullulan; *Citrus Aurantium Dulcis* (Orange) Peel Extract; Cocamide DEA; Cocamide MEA; Cocamide MIPA; Cocamidoethyl Betaine; Cocamidopropyl Betaine; Cocamidopropyl Hydroxysultaine; Coco-Betaine; Coco-Hydroxysultaine; Coconut Alcohol; Coco/Oleamidopropyl Betaine; Coco-Sultaine; Cocoyl Sarcosinamide DEA; Cornamide/Cocamide DEA; Cornamide DEA; Croscarmellose; Crosslinked *Bacillus*/Glucose/Sodium Glutamate Ferment; *Cyamopsis Tetragonoloba* (Guar) Gum; Decyl Alcohol; Decyl Betaine; Dehydroxanthan Gum; Dextrin; Dibenzylidene Sorbitol; Diethanolaminooleamide DEA; Diglycol/CHDM/Isophthalates/SIP Copolymer; Dihydroabietyl Behenate; Dihydrogenated Tallow Benzylmonium Hectorite; Dihydroxyaluminum Aminoacetate; Dimethicone/PEG-10 Crosspolymer; Dimethicone/PEG-15 Crosspolymer; Dimethicone Propyl PG-Betaine; Dimethylacrylamide/Acrylic Acid/Polystyrene Ethyl Methacrylate Copolymer; Dimethylacrylamide/Sodium Acryloyldimethyltaurate Crosspolymer; Disteareth-100 IPDI; DMAPA Acrylates/Acrylic Acid/Acrylonitrogens Copolymer; Erucamidopropyl Hydroxysultaine; Ethylene/Sodium Acrylate Copolymer; Gelatin; Gellan Gum; Glyceryl Alginate; *Glycine Soja* (Soybean) Flour; Guar Hydroxypropyltrimonium Chloride; Hectorite; Hyaluronic Acid; Hydrated Silica; Hydrogenated Potato Starch; Hydrogenated Tallow; Hydrogenated Tallowamide DEA; Hydrogenated Tallow Betaine; Hydroxybutyl Methylcellulose; Hydroxyethyl Acrylate/Sodium Acryloyldimethyl Taurate Copolymer; Hydroxyethylcellulose; Hydroxyethyl Chitosan; Hydroxyethyl cellulose; Hydroxyethyl Stearamide-MIPA; Hydroxylauryl/Hydroxymyristyl Betaine; Hydroxypropylcellulose; Hydroxypropyl Chitosan; Hydroxypropyl Ethylenediamine Carbomer; Hydroxypropyl Guar; Hydroxypropyl Methylcellulose; Hydroxypropyl Methylcellulose Stearoxy Ether; Hydroxypropyl Starch; Hydroxypropyl Starch Phosphate; Hydroxypropyl Xanthan Gum; Hydroxystearamide MEA; Isobutylene/Sodium Maleate Copolymer; Isostearamide DEA; Isostearamide MEA; Isostearamide MIPA; Isostearamidopropyl Betaine;

Lactamide MEA; Lanolinamide DEA; Lauramide DEA; Lauramide MEA; Lauramide MIPA; Lauramide/Myristamide DEA; Lauramidopropyl Betaine; Lauramidopropyl Hydroxysultaine; Laurimino Bispropanediol; Lauryl Alcohol; Lauryl Betaine; Lauryl Hydroxysultaine; Lauryl/Myristyl Glycol Hydroxypropyl Ether; Lauryl Sultaine; Lecithinamide DEA; Linoleamide DEA; Linoleamide MEA; Linoleamide MIPA; Lithium Magnesium Silicate; Lithium Magnesium Sodium Silicate; *Macrocystis Pyrifera* (Kelp); Magnesium Alginate; Magnesium/Aluminum/Hydroxide/Carbonate; Magnesium Aluminum Silicate; Magnesium Silicate; Magnesium Trisilicate; Methoxy PEG-22/Dodecyl Glycol Copolymer; Methylcellulose; Methyl Ethylcellulose; Methyl Hydroxyethylcellulose; Microcrystalline Cellulose; Milkamidopropyl Betaine; Minkamide DEA; Minkamidopropyl Betaine; MIPA-Myristate; Montmorillonite; Moroccan Lava Clay; Myristamide DEA; Myristamide MEA; Myristamide MIPA; Myristamidopropyl Betaine; Myristamidopropyl Hydroxysultaine; Myristyl Alcohol; Myristyl Betaine; Natto Gum; Nonoxynyl Hydroxyethylcellulose; Oatamide MEA; Oatamidopropyl Betaine; Octacosanyl Glycol Isostearate; Octadecene/MA Copolymer; Oleamide DEA; Oleamide MEA; Oleamide MIPA; Oleamidopropyl Betaine; Oleamidopropyl Hydroxysultaine; Oleyl Betaine; Olivamide DEA; Olivamidopropyl Betaine; Oliveamide MEA; Palmamide DEA; Palmamide MEA; Palmamide MIPA; Palmamidopropyl Betaine; Palmitamide DEA; Palmitamide MEA; Palmitamidopropyl Betaine; Palm Kernel Alcohol; Palm Kernelamide DEA; Palm Kernelamide MEA; Palm Kernelamide MIPA; Palm Kernelamidopropyl Betaine; Peanutamide MEA; Peanutamide MIPA; Pectin; PEG-800; PEG-Crosspolymer; PEG-150/Decyl Alcohol/SMDI Copolymer; PEG-175 Diisostearate; PEG-190 Distearate; PEG-15 Glyceryl Tristearate; PEG-140 Glyceryl Tristearate; PEG-240/HDI Copolymer Bis-Decyltetradeceth-20 Ether; PEG-100/IPDI Copolymer; PEG-180/Laureth-50/TMMG Copolymer; PEG-10/Lauryl Dimethicone Crosspolymer; PEG-15/Lauryl Dimethicone Crosspolymer; PEG-2M; PEG-5M; PEG-7M; PEG-9M; PEG-14M; PEG-20M; PEG-23M; PEG-25M; PEG-45M; PEG-65M; PEG-90M; PEG-115M; PEG-160M; PEG-180M; PEG-120 Methyl Glucose Trioleate; PEG-180/Octoxynol-40/TMMG Copolymer; PEG-150 Pentaerythrityl Tetrastearate; PEG-4 Rapeseedamide; PEG-150/Stearyl Alcohol/SMDI Copolymer; *Phaseolus Angularis* Seed Powder; *Polianthes Tuberosa* Extract; Polyacrylate-3; Polyacrylic Acid; Polycyclopentadiene; Polyether-1; Polyethylene/Isopropyl Maleate/MA Copolyol; Polyglyceryl-3 Disiloxane Dimethicone; Polyglyceryl-3 Polydimethylsiloxyethyl Dimethicone; Polymethacrylic Acid; Polyquaternium-52; Polyvinyl Alcohol; Potassium Alginate; Potassium Aluminum Polyacrylate; Potassium Carbomer; Potassium Carrageenan; Potassium Chloride; Potassium Palmate; Potassium Polyacrylate; Potassium Sulfate; Potato Starch Modified; PPG-2 Cocamide; PPG-1 Hydroxyethyl Caprylamide; PPG-2 Hydroxyethyl Cocamide; PPG-2 Hydroxyethyl Coco/Isostearamide; PPG-3 Hydroxyethyl Soyamide; PPG-14 Laureth-60 Hexyl Dicarbamate; PPG-14 Laureth-60 Isophoryl Dicarbamate; PPG-14 Palmeth-60 Hexyl Dicarbamate; Propylene Glycol Alginate; PVP/Decene Copolymer; PVP Montmorillonite; *Pyrus Cydonia* Seed; *Pyrus Malus* (Apple) Fiber; Rhizobian Gum; Ricebranamide DEA; Ricinoleamide DEA; Ricinoleamide MEA; Ricinoleamide MIPA; Ricinoleamidopropyl Betaine; Ricinoleic Acid/Adipic Acid/AEEA Copolymer; *Rosa Multiflora* Flower Wax; *Sclerotium* Gum; Sesamide DEA; Sesamidopropyl Betaine; Sodium Acrylate/Acryloyldimethyl Taurate Copolymer; Sodium Acrylates/Acrolein Copolymer; Sodium Acrylates/Acrylonitrogens Copolymer; Sodium Acrylates Copolymer; Sodium Acrylates Crosspolymer; Sodium Acrylate/Sodium Acrylamidomethylpropane Sulfonate Copolymer; Sodium Acrylates/Vinyl Isodecanoate Crosspolymer; Sodium Acrylate/Vinyl Alcohol Copolymer; Sodium Carbomer; Sodium Carboxymethyl Chitin; Sodium Carboxymethyl Dextran; Sodium Carboxymethyl Beta-Glucan; Sodium Carboxymethyl Starch; Sodium Carrageenan; Sodium Cellulose Sulfate; Sodium Chloride; Sodium Cyclodextrin Sulfate; Sodium Hydroxypropyl Starch Phosphate; Sodium Isooctylene/MA Copolymer; Sodium Magnesium Fluorosilicate; Sodium Oleate; Sodium Palmitate; Sodium Palm Kernelate; Sodium Polyacrylate; Sodium Polyacrylate Starch; Sodium Polyacryloyldimethyl Taurate; Sodium Polygamma-Glutamate; Sodium Polymethacrylate; Sodium Polystyrene Sulfonate; Sodium Silicoaluminate; Sodium Starch Octenylsuccinate; Sodium Stearate; Sodium Stearoxy PG-Hydroxyethylcellulose Sulfonate; Sodium Styrene/Acrylates Copolymer; Sodium Sulfate; Sodium Tallowate; Sodium Tauride Acrylates/Acrylic Acid/Acrylonitrogens Copolymer; Sodium Tocopheryl Phosphate; *Solanum Tuberosum* (Potato) Starch; Soyamide DEA; Soyamidopropyl Betaine; Starch/Acrylates/Acrylamide Copolymer; Starch Hydroxypropyltrimonium Chloride; Stearamide AMP; Stearamide DEA; Stearamide DEA-Distearate; Stearamide DIBA-Stearate; Stearamide MEA; Stearamide MEA-Stearate; Stearamide MIPA; Stearamidopropyl Betaine; Steareth-60 Cetyl Ether; Steareth-100/PEG-136/HDI Copolymer; Stearyl Alcohol; Stearyl Betaine; *Sterculia Urens* Gum; Synthetic Fluorphlogopite; Tallamide DEA; Tallow Alcohol; Tallowamide DEA; Tallowamide MEA; Tallowamidopropyl Betaine; Tallowamidopropyl Hydroxysultaine; Tallowamine Oxide; Tallow Betaine; Tallow Dihydroxyethyl Betaine; *Tamarindus Indica* Seed Gum; Tapioca Starch; TEA-Alginate; TEA-Carbomer; TEA-Hydrochloride; Trideceth-2 Carboxamide MEA; Tridecyl Alcohol; Triethylene Glycol Dibenzoate; Trimethyl Pentanol Hydroxyethyl Ether; *Triticum Vulgare* (Wheat) Germ Powder; *Triticum Vulgare* (Wheat) Kernel Flour; *Triticum Vulgare* (Wheat) Starch; Tromethamine Acrylates/Acrylonitrogens Copolymer; Tromethamine Magnesium Aluminum Silicate; Undecyl Alcohol; Undecylenamide DEA; Undecylenamide MEA; Undecylenamidopropyl Betaine; Welan Gum; Wheat Germamide DEA; Wheat Germamidopropyl Betaine; Xanthan Gum; Yeast Beta-Glucan; Yeast Polysaccharides and *Zea Mays* (Corn) Starch.

In one such embodiment, the thickeners or viscosity increasing agents include carbomers, Aculyn™ and Stabileze®, e.g., crosslinked acrylic acid, crosslinked poly(methylvinyl ether/maleic anhydride) copolymer, acrylamides, carboxymethyl cellulose, and the like.

The personal care/cosmetic composition of the invention can contain at least one amphoteric polymer or a cationic polymer in combination with the above-described polymer. The cationic or amphoteric polymer or polymers can be present in an amount from about 0.01% to about 10%, particularly from about 0.05% to about 5%, and more particularly from about 0.1% to about 3% by weight of the total weight of the composition.

For some embodiments, it may be preferred to add one or more preservatives and/or antimicrobial agents, such as, but not limited to, benzoic acid, sorbic acid, dehydroacetic acid, piroctone olamine, DMDM hydantoin, IPBC, triclosan, bronopol, formaldehyde, isothiazolinones, nitrates/nitrites, parabens, phenoxyethanol, potassium sorbate, sodium benzoate, sulphites, and sulphur dioxide. Combinations of preservatives may be used.

In other embodiments it may be desirable to incorporate preservative boosters/solvents, select examples of which include caprylyl glycol, hexylene glycol, pentylene glycol, ethylhexylglycerin, caprylhydroxamic acid, and glyceryl caprylate.

In other embodiments it may be desirable to include one or more other ingredients, such as synthetic and natural oils and waxes. The synthetic oils include polyolefins, e.g., poly-α-olefins such as polybutenes, polyisobutenes and polydecenes. The polyolefins can be hydrogenated. The mineral oils suitable for use in the compositions of the invention include hexadecane and oil of paraffin. Suitable animal and vegetable oils include sunflower, corn, soy, avocado, jojoba, squash, raisin seed, sesame seed, walnut oils, fish oils, glycerol tricaprocaprylate, Purcellin oil or liquid jojoba. Suitable natural or synthetic oils include *eucalyptus*, lavender, vetiver, *litsea cubeba*, lemon, sandalwood, rosemary, chamomile, savory, nutmeg, cinnamon, hyssop, caraway, orange, geranium, cade, and bergamot. Suitable natural and synthetic waxes include carnauba wax, candelila wax, alfa wax, paraffin wax, ozokerite wax, vegetable waxes such as olive wax, rice wax, hydrogenated jojoba wax, absolute flower waxes such as black currant flower wax, animal waxes such as bees wax, modified bees wax (cerabellina), marine waxes and polyolefin waxes such as polyethylene wax.

The personal care/cosmetic compositions may be used to wash and treat keratinous material such as hair, skin, eyelashes, eyebrows, fingernails, lips, and hairy skin. The invention provides a method for treating keratinous material including the skin or hair, by applying to skin or keratinous materials a personal care/cosmetic composition as described above, and then eventually rinsing it with water. Accordingly, the method makes it possible to maintain the hairstyle, treatment, care, washing, or make-up removal of the skin, the hair, and any other keratinous material.

The personal care/cosmetic compositions described herein are useful in personal care/cosmetic products, including, but not limited to, gels, lotions, glazes, glues, mousses, sprays, fixatives, shampoos, conditioners, 2-in-1 shampoos, temporary hair dyes, semi-permanent hair dyes, permanent hair dyes, straighteners, permanent waves, relaxers, creams, putties, waxes, pomades, moisturizers, mascaras, lip balms and foam enhancers. The personal care/cosmetic compositions can be detergent compositions such as shampoos, bath gels, and bubble baths. In this mode, the compositions will comprise a generally aqueous washing base. The surfactant or surfactants that form the washing base may be chosen alone or in blends, from known anionic, amphoteric, or non-ionic surfactants. The quantity and quality of the washing base must be sufficient to impart a satisfactory foaming and/or detergent value to the final composition. The washing base can be from about 4% to about 50% by weight, particularly from about 6% to about 35% by weight, and even more particularly from about 8% to about 25% by weight of the total weight of the final composition. The personal care/cosmetic compositions may also take the form of after-shampoo compositions, to be rinsed off or not, for permanents, straightening, waving, dyeing, or bleaching, or the form of rinse compositions to be applied before or after dyeing, bleaching, permanents, straightening, relaxing, waving or even between the two stages of a permanent or straightening process. The personal care/cosmetic compositions may also take the form of skin-washing compositions, and particularly in the form of solutions or gels for the bath or shower, or of make-up removal products. The personal care/cosmetic compositions may also be in the form of aqueous or hydro-alcoholic solutions for skin and/or hair care.

The pH of the composition applied to the keratinous material is generally between 2 and 12. In one embodiment, the pH is from about 3 to about 8, and may be adjusted to the desired value by means of acidifying or alkalinizing agents that are well known in the state of the art. Thus, the composition of the invention can contain at least one alkalizing or acidifying agent in amounts from about 0.01% to about 30% based on the total weight of the composition.

The alkalizing agent can be chosen from ammonia, alkali hydroxides, alkali carbonates, alkanolamines, like mono-, di- and triethanolamines, as well as their derivatives, hydroxyalkylamines and ethoxylated and/or propoxylated ethylenediamines, unsubstituted and substituted propylenediamines.

The acidifying agent can be chosen from mineral or organic acids, like hydrochloric acid, orthophosphoric acid, carboxylic acids like tartaric acid, citric acid, or lactic acid, or sulfonic acids, and the like.

The personal care/cosmetic compositions of the invention may include a physiological and cosmetically acceptable medium. Such medium may consist exclusively of water, a cosmetically acceptable solvent, or a blend of water and a cosmetically acceptable solvent, such as a lower alcohol composed of $C_1$ to $C_4$, such as ethanol, isopropanol, t-butanol, n-butanol, alkylene glycols such as propylene glycol, and glycol ethers. Alternatively, the personal care/cosmetic compositions can be anhydrous.

Generally, personal care/cosmetic compositions can be prepared by simple mixing procedures well known in the art.

The invented polymers can be prepared according to the examples set out below. The examples are presented for purposes of demonstrating, but not limiting, the preparation of the compounds and compositions of this invention.

EXAMPLES

The following non-limiting examples are provided to illustrate a few methods for preparing the amidic polymers.

Example 1

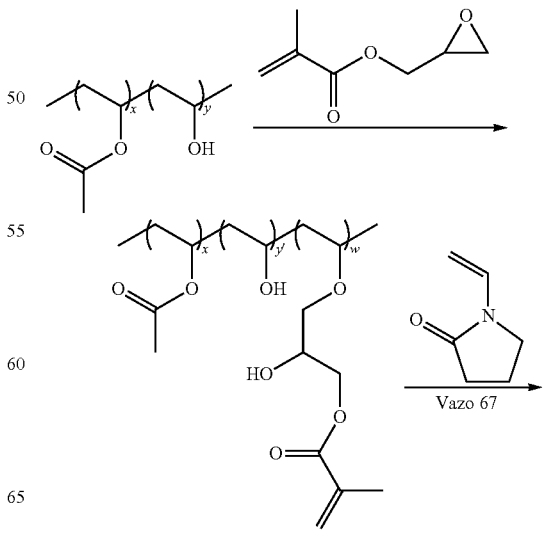

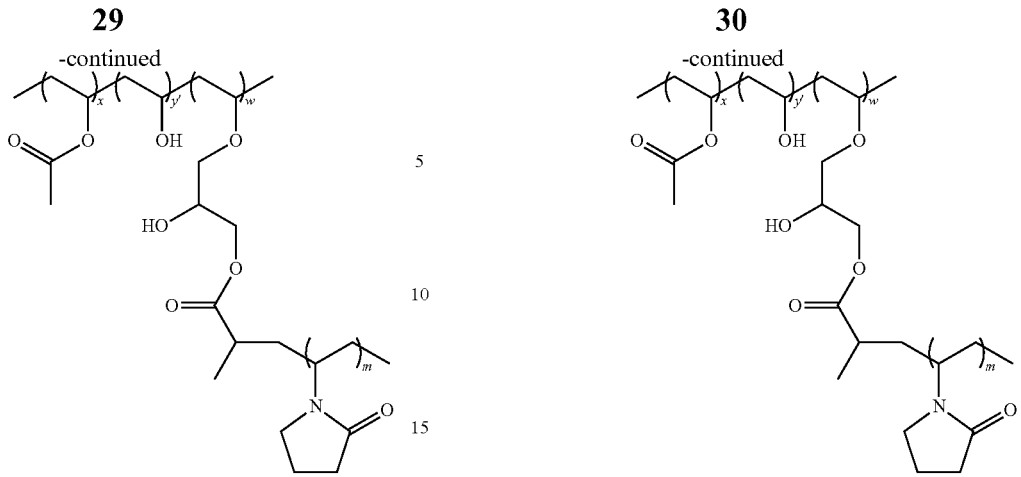

In a 1-L reactor equipped with thermocouple, nitrogen inlet, reflux condenser, 250 g of poly(vinyl alcohol) (PVA, Mowiol 385) aqueous solution (20%) was added to the reactor. The reactor was heated to 70° C. under nitrogen purging. Then, glycidyl methacrylate (GMA, 2.16 g) was added. After 6 hours of reaction, GMA was non-detectable by GC. Then, 50 g high purity vinyl pyrrolidone (HPVP) and 200 g deionized water (DI) were added to the reaction kettle. An initiator solution was prepared by mixing 0.3 g Vazo 67 with 1.7 g isopropyl alcohol (IPA). When the reaction temperature was stabilized at 70° C., 1 g initiator solution was added to the reaction kettle. After 30 minutes, the remaining initiator solution was added into the reaction kettle. Then, the reaction was maintained at 70° C. for 5 hours, and then allowed to cool to room temperature. Upon cooling, colorless and viscous polymer was discharged from the reaction kettle. The residual HPVP is less than 0.1%. The solids of the product are 19.45% polymer in water.

50 g PVA powder and 200 g DI water were added into a 1-L reactor equipped with thermocouple, nitrogen inlet and reflux condenser. The reactor was heated to 85° C. over 2 hours under nitrogen purging. The reaction temperature was maintained for 2 hours and then cooled down to 70° C. Glycidyl methacrylate (GMA, 2.05 g) and 3.0 g 20% NaOH aqueous solution were added to the reactor. After 6 hours of reaction, 50 g high purity vinyl pyrrolidone (HPVP) and 200 g DI water were added into the reaction kettle. An initiator solution was prepared by mixing 0.3 g Vazo 67 with 1.7 g isopropyl alcohol (IPA). When the reaction temperature reached 70° C., 1 g initiator solution was added to the reactor. After 30 minutes, the remaining initiator solution was added and reaction was maintained at 70° C. for 5 hours. Then, the reaction mixture was cooled to room temperature to discharge. The product obtained is colorless and viscous solution. The residual HPVP is less than 0.1%. The solids of the product are 20% polymer in water.

Example 2

Example 3

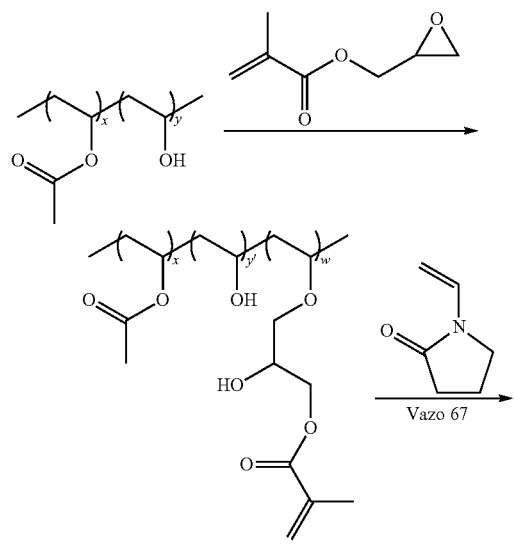

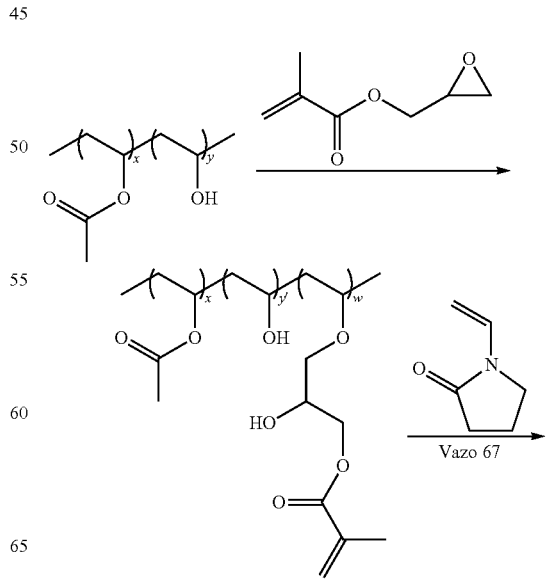

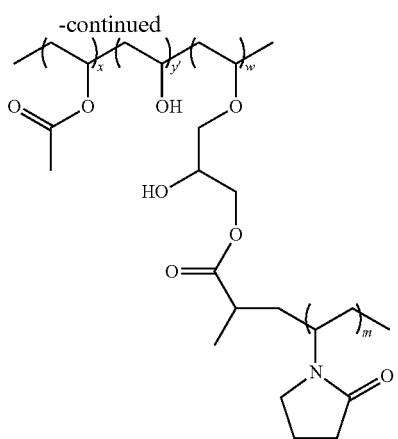

A 1-L reactor was equipped with thermocouple, nitrogen inlet and reflux condenser. PVA powder (50 g) and DI water (250 g) were added into the reactor and heated to 85° C. over 2 hours under nitrogen purging. The reaction temperature was maintained for 2 hours and then cooled down to 70° C. Then, glycidyl methacrylate (GMA, 2.05 g) and 3.0 g 20% NaOH aqueous solution were added to the reactor. After 6 hours of reaction, 50 g high purity vinyl pyrrolidone (HPVP) and 250 g DI water were added into the reactor. An initiator solution was prepared by mixing 0.36 g Vazo 67 with 1.7 g isopropyl alcohol (IPA). When the reaction temperature was stabilized at 70 C, 1 g initiator solution was added. After 30 minutes, the remaining initiator solution was added and reaction was maintained at 70° C. for 5 hours. The reaction mixture was then allowed to cool to room temperature. Upon cooling, colorless and viscous polymer was discharged from the reaction kettle. The residual HPVP is less than 0.1%. The solids of the product are 15.4% polymer in water.

Example 4

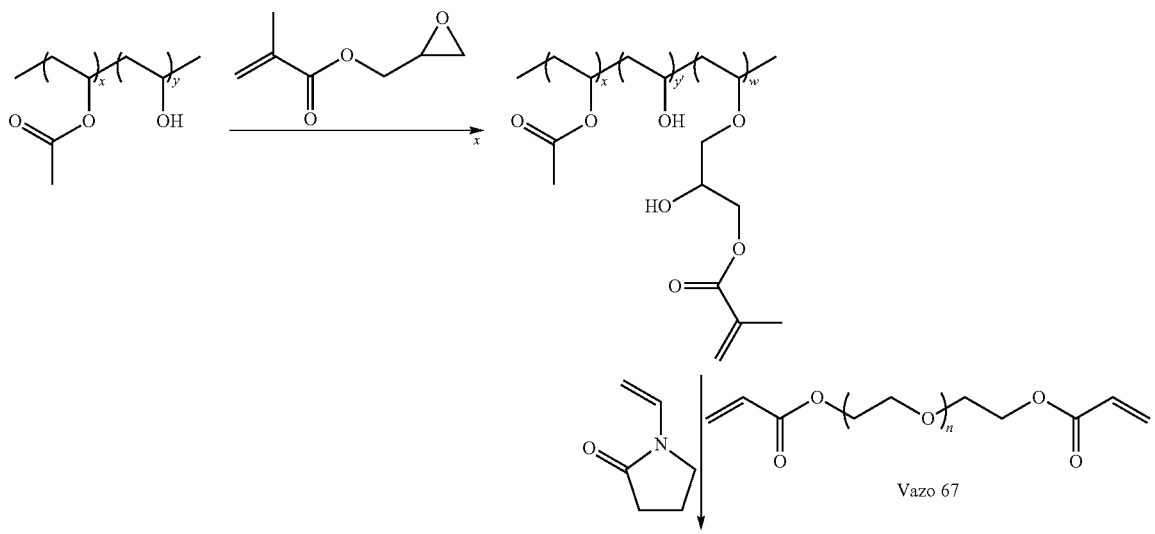

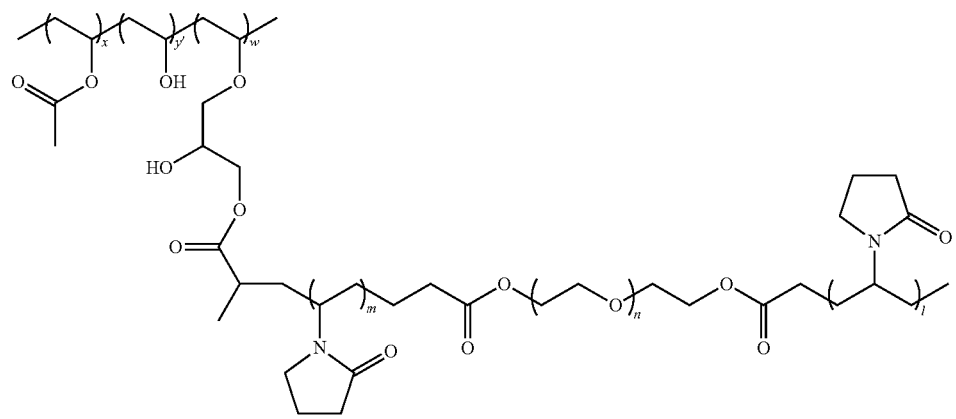

In a 1-L reactor equipped with thermocouple, nitrogen inlet, reflux condenser, 250 g of PVA (Mowiol 385) aqueous solution (20%) was added to the reactor. The reactor was heated to 70° C. under nitrogen purging. Then, glycidyl methacrylate (GMA, 2.16 g) was added. After 6 hours of reaction, 50 g high purity vinyl pyrrolidone (HPVP), 1.0 g polyethylene glycol diacrylate (SR259 from Sartomer) and 200 g DI water were added into the reaction kettle. Initiator solution was prepared by mixing 0.3 g Vazo 67 with 1.7 g isopropyl alcohol (IPA). When the reaction temperature was stabilized at 70° C., 1 g initiator solution was added to the reaction kettle. After 30 minutes, the remaining initiator solution was added into the reaction kettle. Then, the reaction was maintained at 70° C. for 5 hours, and then allowed to cool to room temperature. Upon cooling, colorless and viscous polymer was discharged from the reaction kettle. The residual HPVP obtained is less than 0.1% and the solids of the product are 19.45% polymer in water.

Example 5

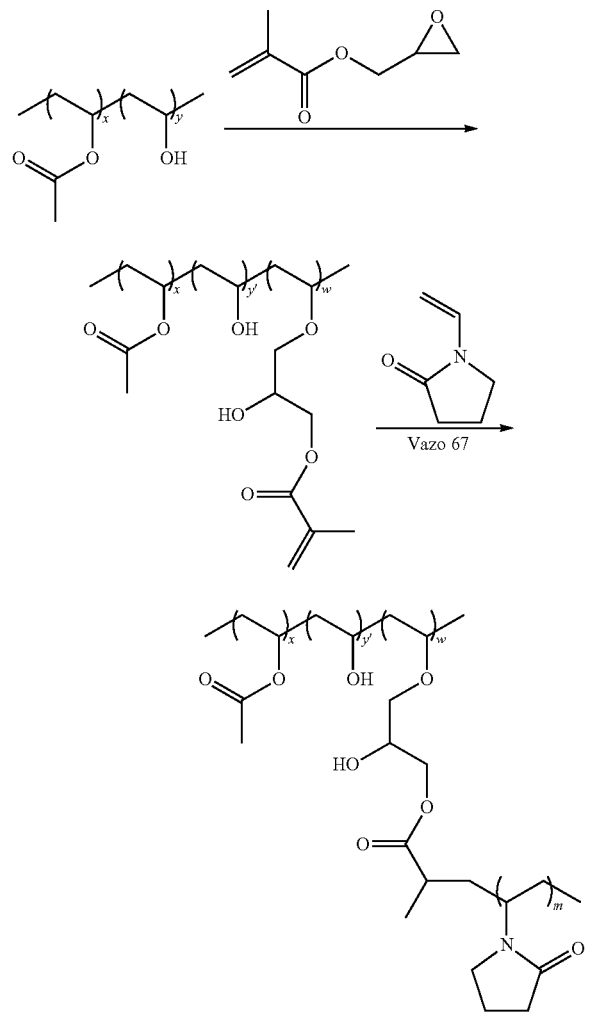

In a 1-L reactor equipped with thermocouple, nitrogen inlet, reflux condenser, 250 g of PVA aqueous solution (20%) was added. The reactor was heated to 70° C. under nitrogen purging. Then, glycidyl methacrylate (GMA, 2.16 g) was added and reaction was maintained for 6 hours. 50 g high purity vinyl pyrrolidone (HPVP) was mixed with 200 g DI water, adjusted to pH<7 by acid and then added into the reaction kettle. Initiator solution was prepared by mixing 0.3 g Vazo 67 with 1.7 g Isopropyl alcohol (IPA). When the reaction temperature was stabilized at 70° C., 1 g initiator solution was added to the reaction kettle. After 30 minutes, the remaining initiator solution was added into the reaction kettle. Then, the reaction was maintained at 70° C. for 5 hours, and then allowed to cool to room temperature. Upon cooling, colorless and viscous polymer was discharged from the reaction kettle. The residual HPVP is less than 0.1%. The solids of the product is 19.45% polymer in water Example 6

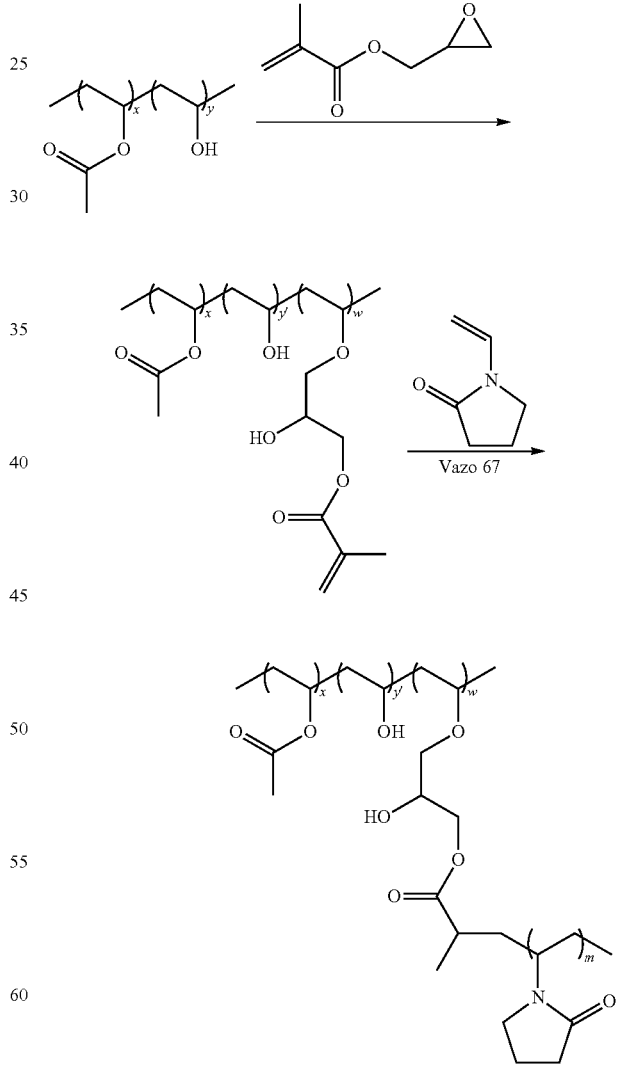

In a 1-L reactor equipped with thermocouple, nitrogen inlet and reflux condenser, 280 g of PVOH (Mowiol) aqueous solution (10%), 50 g HPVP and 1.5 g glycidyl methacrylate (GMA) were added and heated to 70° C. under nitrogen purging. Then, 190 g DI water was added to the reactor. An initiator solution was prepared by mixing 0.36 g Vazo 67 with 1.7 g isopropyl alcohol (IPA). When the reaction temperature reached 70° C., 1.18 g initiator solution was added to the reaction kettle. After 30 minutes, the remaining initiator solution was added into the reaction kettle. Then, the reaction was maintained at 70° C. for 6 hours, and then allowed to cool to room temperature. Upon cooling, colorless and viscous polymer was discharged from the reaction kettle. The residual HPVP is less than 0.1%. The solids of the product is 15.88% polymer in water.

Example 7

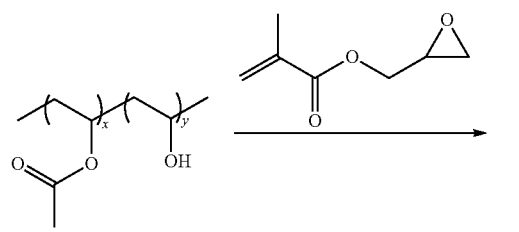

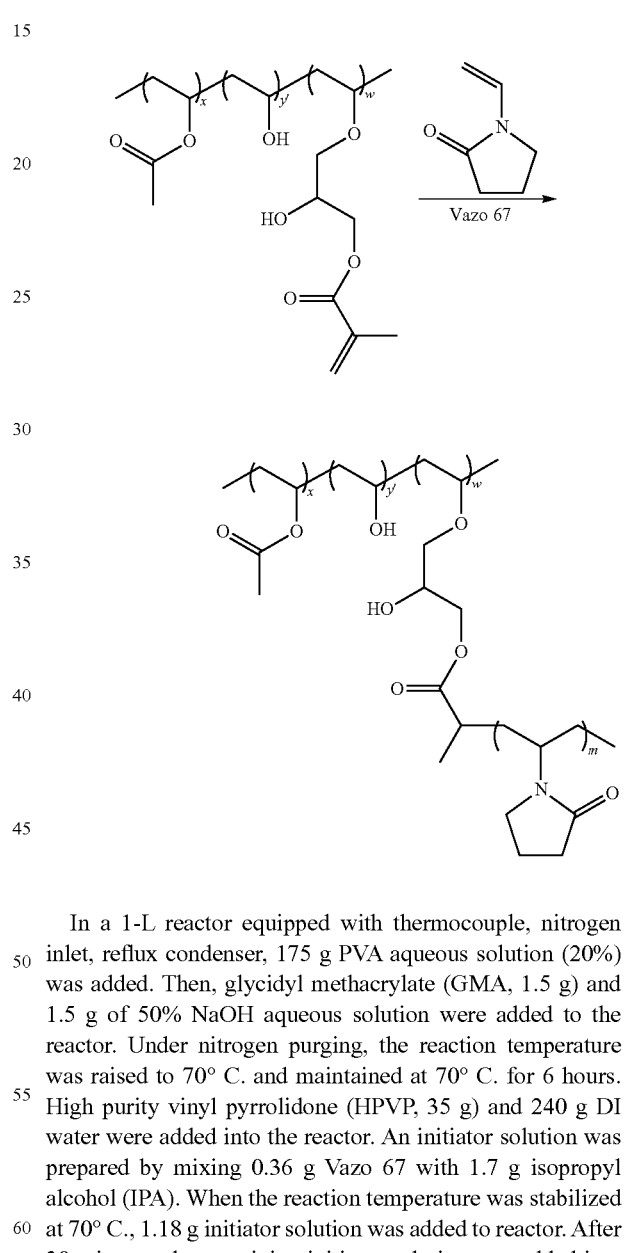

The method set out in Example 6 was followed with the changes: the reactant ratio of PVA:GMA:VP was 25:14:1; and the reaction solvent was N-methylpyrrolidone (NMP). The obtained was viscous slightly hazy product.

Example 8

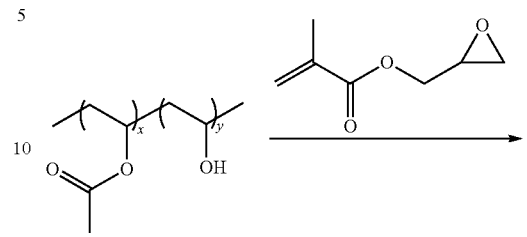

In a 1-L reactor equipped with thermocouple, nitrogen inlet, reflux condenser, 175 g PVA aqueous solution (20%) was added. Then, glycidyl methacrylate (GMA, 1.5 g) and 1.5 g of 50% NaOH aqueous solution were added to the reactor. Under nitrogen purging, the reaction temperature was raised to 70° C. and maintained at 70° C. for 6 hours. High purity vinyl pyrrolidone (HPVP, 35 g) and 240 g DI water were added into the reactor. An initiator solution was prepared by mixing 0.36 g Vazo 67 with 1.7 g isopropyl alcohol (IPA). When the reaction temperature was stabilized at 70° C., 1.18 g initiator solution was added to reactor. After 30 minutes, the remaining initiator solution was added into the reaction kettle. Reaction temperature was maintained at 70° C. for 5 hours, and then allowed to cool to room temperature. Upon cooling, colorless and viscous polymer was discharged from the reaction kettle. The residual HPVP was less than 0.1%.

Examples 9-10
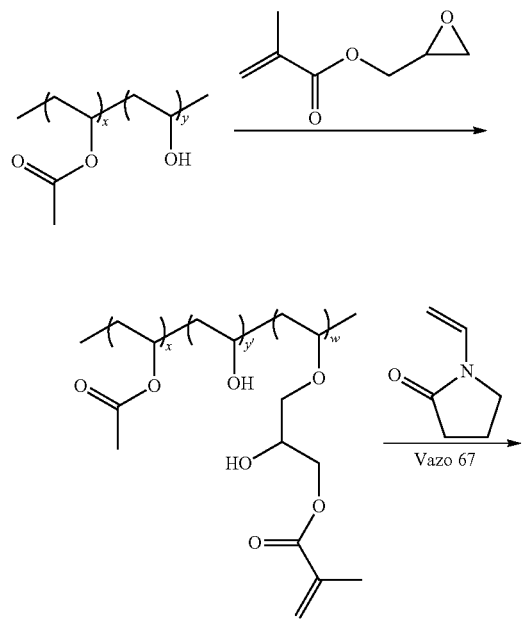
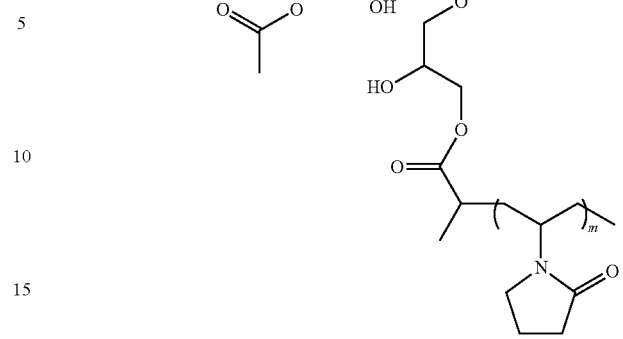
The method of Example 8 was followed with the following changes of the reactant ratios.
| Exp# | PVA | GMA | VP | Solids % |
|------|-----|-----|-----|----------|
| 9    | 28  | 1.5 | 50  | 15       |
| 10   | 28  | 2.7 | 50  | 15       |
Example 11
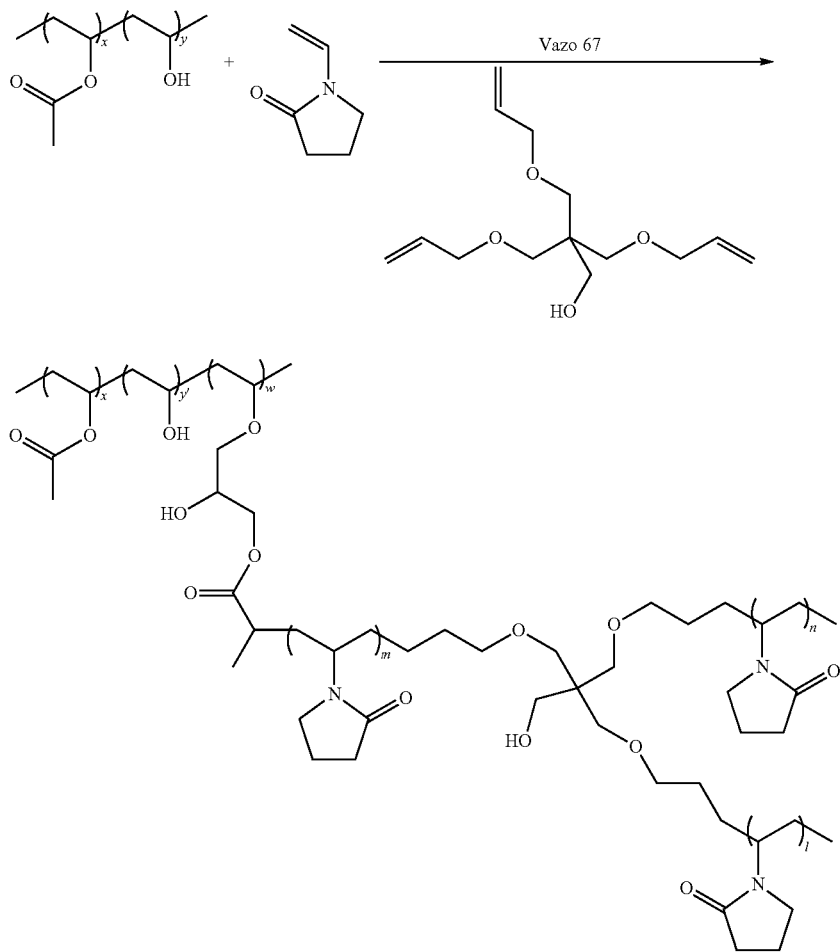

In a 1-L reactor equipped with thermocouple, nitrogen inlet and reflux condenser, 280 g of PVA (Mowiol 385) aqueous solution (10%) was added into the reactor. Under nitrogen purging, the reaction temperature was raised to 70° C. Then, 50 g high purity vinyl pyrrolidone (HPVP) and 0.075 g PETA (pentaerythritol triallyl ether) were added into the reaction kettle. An initiator solution was prepared by mixing 0.36 g Vazo 67 with 2.0 g isopropyl alcohol (IPA). When the reaction temperature was stabilized at 70° C., 1.18 g initiator solution was added to the reaction kettle. After 30 minutes, the remaining initiator solution was added into the reaction kettle. Then, the reaction was maintained at 70° C. for 5 hours, and then allowed to cool to room temperature. Upon cooling, colorless and viscous polymer was discharged from the reaction kettle. The residual HPVP was less than 0.1%. The product contains crosslinked and non-crosslinked polymer.

Example 12-13

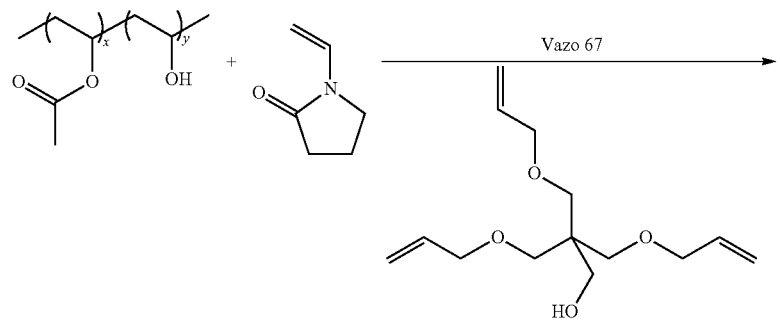

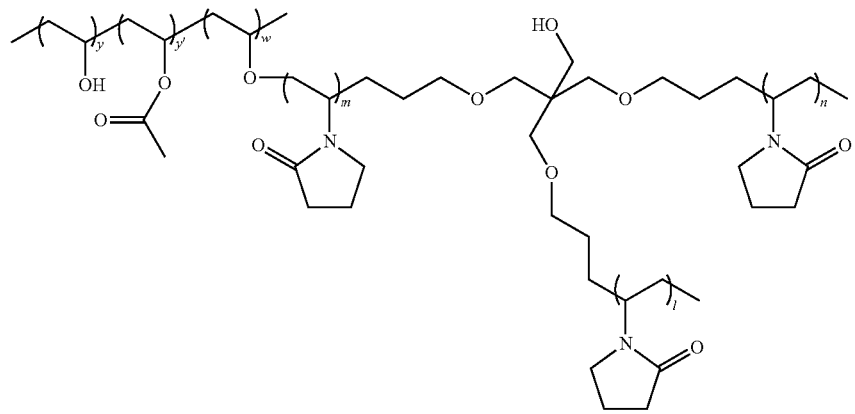

The method of Example 11 was followed with the following changes of PVA/HPVP ratio.

| Exp# | Composition |
|---|---|
| 12 | 20:30 PVA/HPVP and 0.046 g PETE |
| 13 | 15:25 PVA/HPVP and 0.0375 g PETE |

Example 14

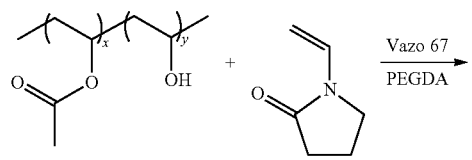

-continued

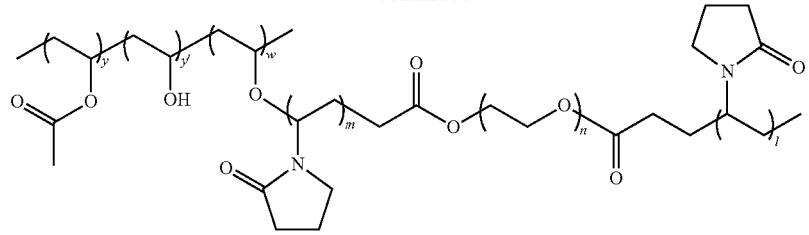

Note: PEGDA-Polyethylene glydol diacrylate

The method of Example 11 was followed replacing PETE (pentaerythriol triallyl ether) with PEGDA (polyethylene glycol diacrylate (SR259 from Sartomer). The ratio of PVA/HPVP ratio was 28/50.

Example 15

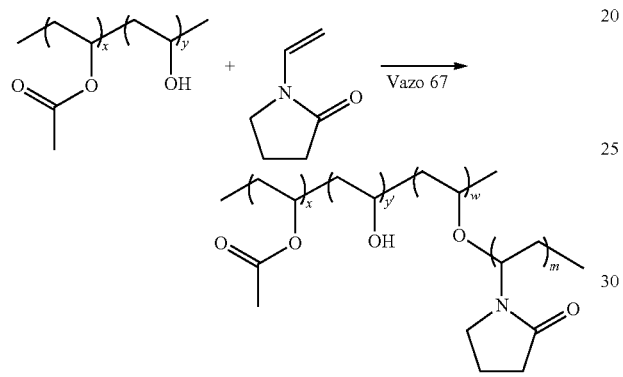

The method of Example 14 was followed without the addition of PEGDA (polyethylene glycol diacrylate, SR259 from Sartomer).

Example 16

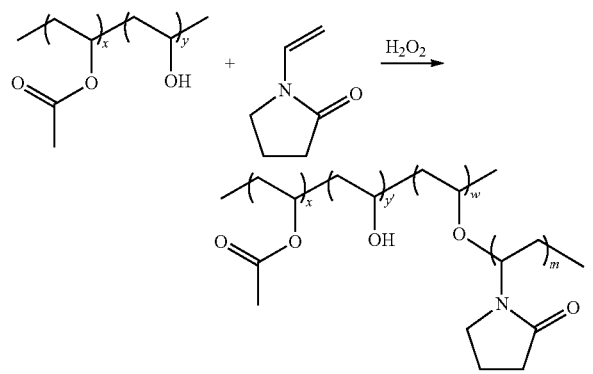

In a 1-L reactor equipped with thermocouple, nitrogen inlet and reflux condenser, 280 g of PVA aqueous solution (10%) and 118 g DI water were added. Under nitrogen purging, the reaction temperature was raised to 70° C. and 0.3 g ammonium hydroxide was added to the reactor. Then, 1.5 g hydrogen peroxide aqueous solution (35%) was added to the reactor. The reaction was held for 50 minutes. A Pre-mix of 50 g high purity vinyl pyrrolidone (HPVP) and 32 g of DI water was fed into the reactor over 1 hour. Then three shots of hydrogen peroxide were added to the reactor every 15 minutes. Then, the reaction was maintained at 70° C. for 5 hours, and then allowed to cool to room temperature. Upon cooling, the colorless and viscous polymer was discharged from the reaction kettle. The residual HPVP was less than 0.1%.

Example 17

PVP K90 and PVA Blend

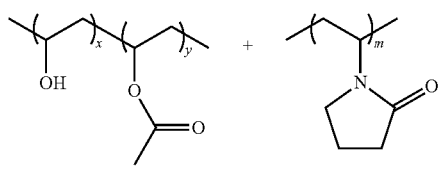

25 g PVP K90 powder (from ISP) was mixed with 95 g of DI water. The reaction mixture was magnetically stirred until the solution was clear. A quantity of 140 g of PVA aqueous solution (10%) was added to the glass jar and well mixed. The sample obtained was a slightly yellowish clear solution.

Example 18

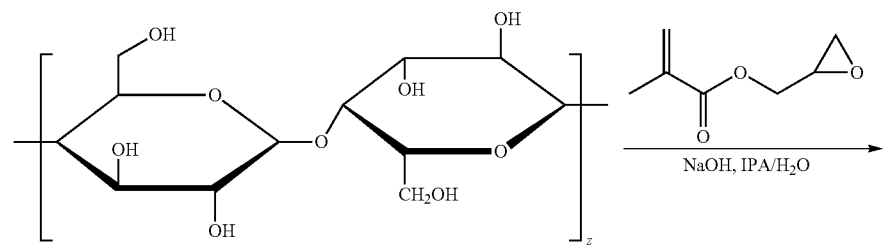

-continued

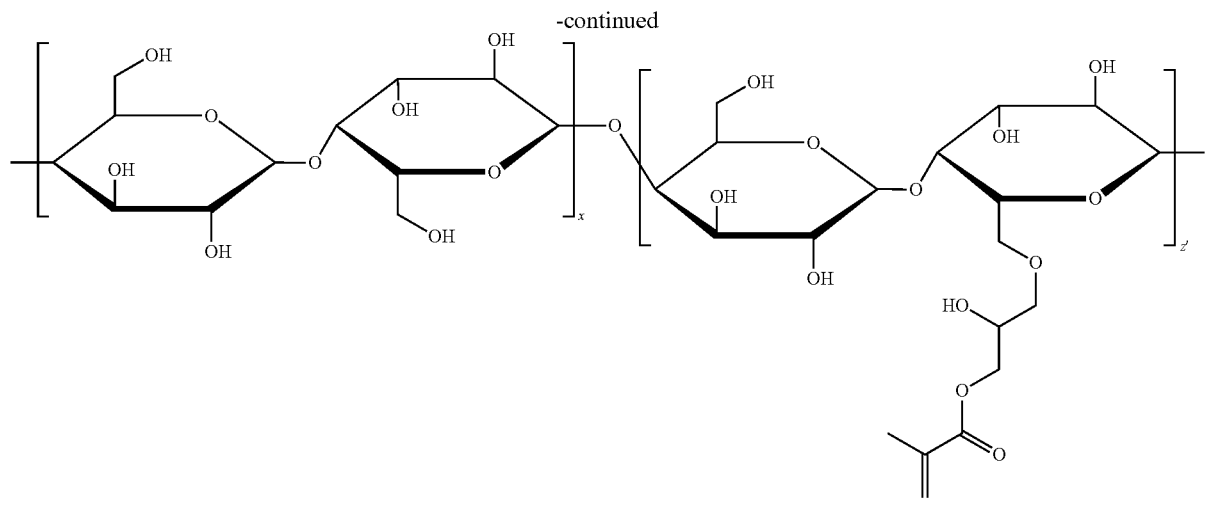

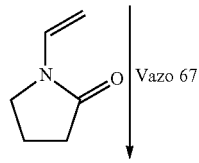

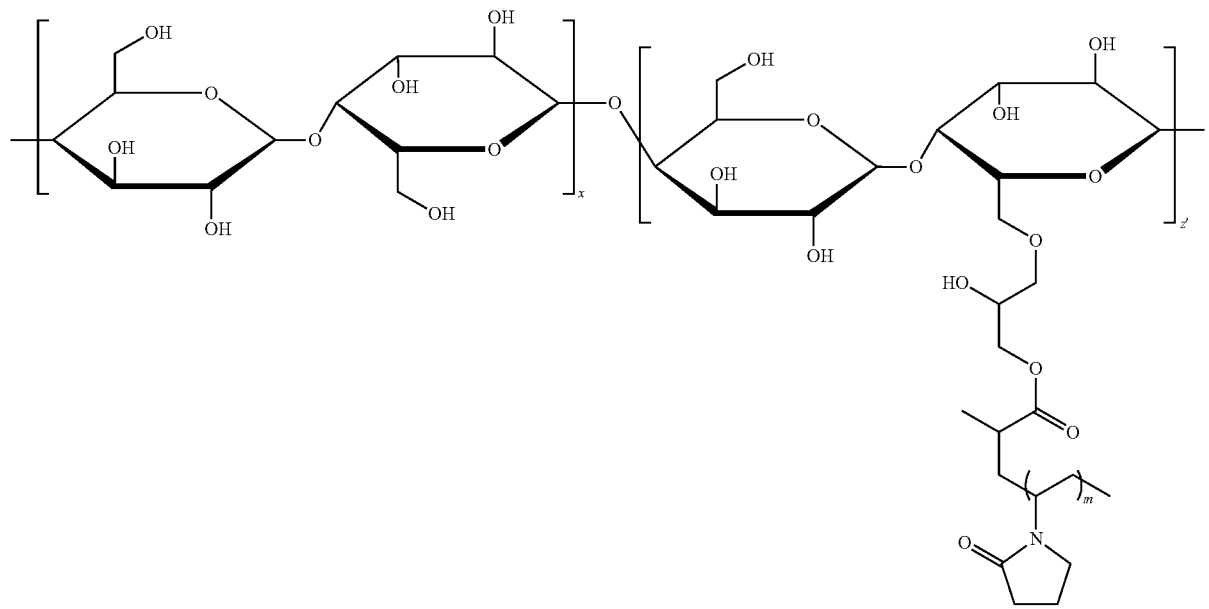

In a 1-L reactor equipped with thermocouple, nitrogen inlet and reflux condenser, 50 g Celluosize HEC-15 powder (from Dow), 20 g DI water and 180 g isopropyl alcohol (IPA) were added. Then, 8 g NaOH aqueous solution (50%) was added into the reactor. The reaction mixture was stirred 16 hours at room temperature. Under nitrogen purging, the reaction temperature was increased to 50° C. and glycidyl methacrylate (GMA, 5.0 g) was added into the reactor. The reaction temperature was maintained for 6 hours at 70° C. Then five parts of 8 g HPVP followed by five shots of Vazo 67 (dissolved in IPA) were added into the reactor every 15 minutes. After the final charge of HPVP and initiator, the reaction was maintained for 2 hours. Three shots of Vazo 67 solution were added into the reactor every 30 minutes. The reaction was then kept for 1 hour and two shots of Trigonox 25 C75 (0.5 g of each) were added into the reactor every 2 hours. The reaction was continued for another 2 hours and then cooled down to room temperature to discharge. The reaction mixture was washed with acetone, filtrated and dried in vacuum oven at 50° C. The product obtained was a yellowish powder. The yield was 69.7%

Example 19
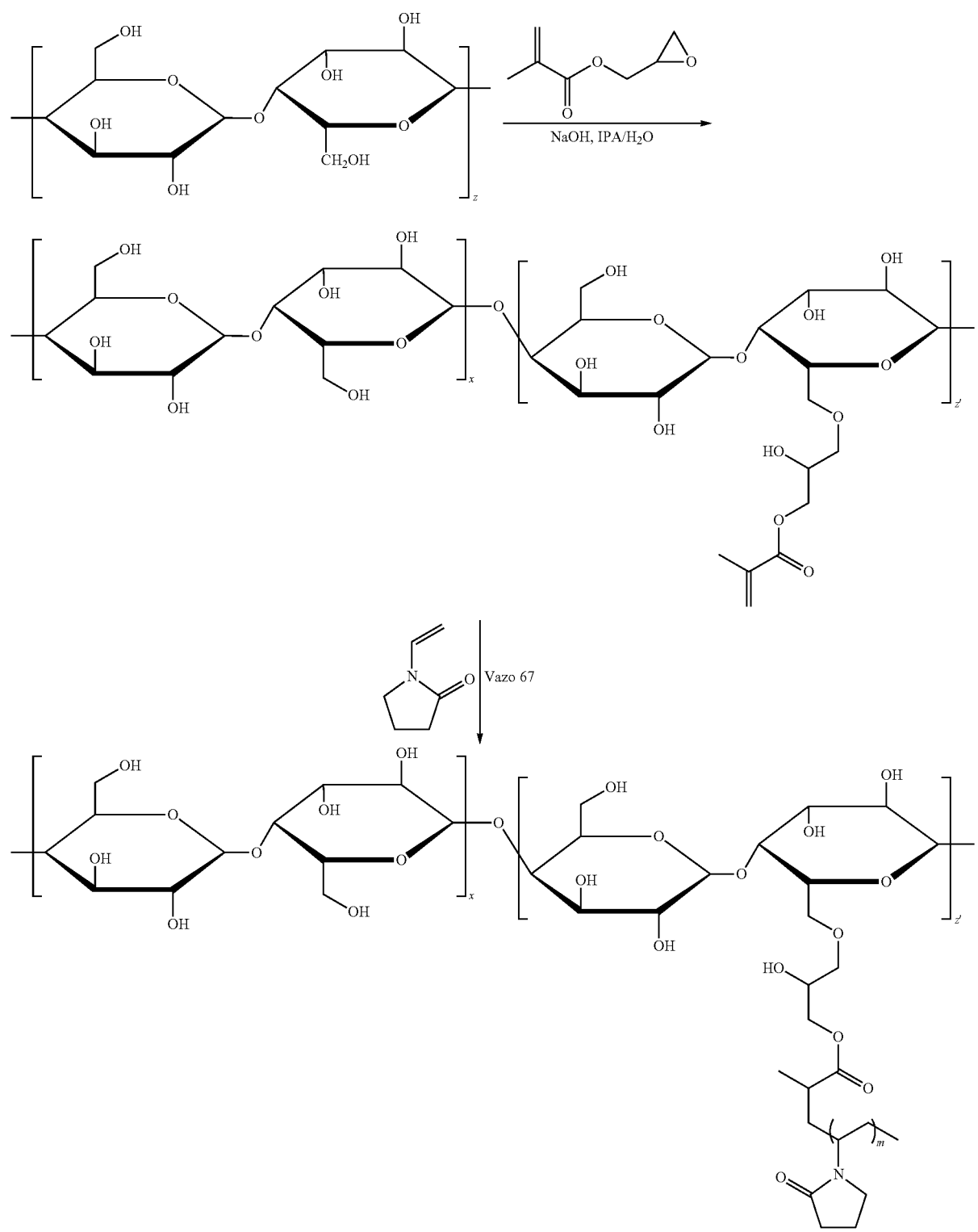
The procedure of Example 1 was used followed with the following changes: 7.0 g of KOH was used instead of 8 g 20% NaOH; the GMA amount added into the reactor was 8.5 g; the HPVP amount added into the reactor was 41.5 g.

Example 20

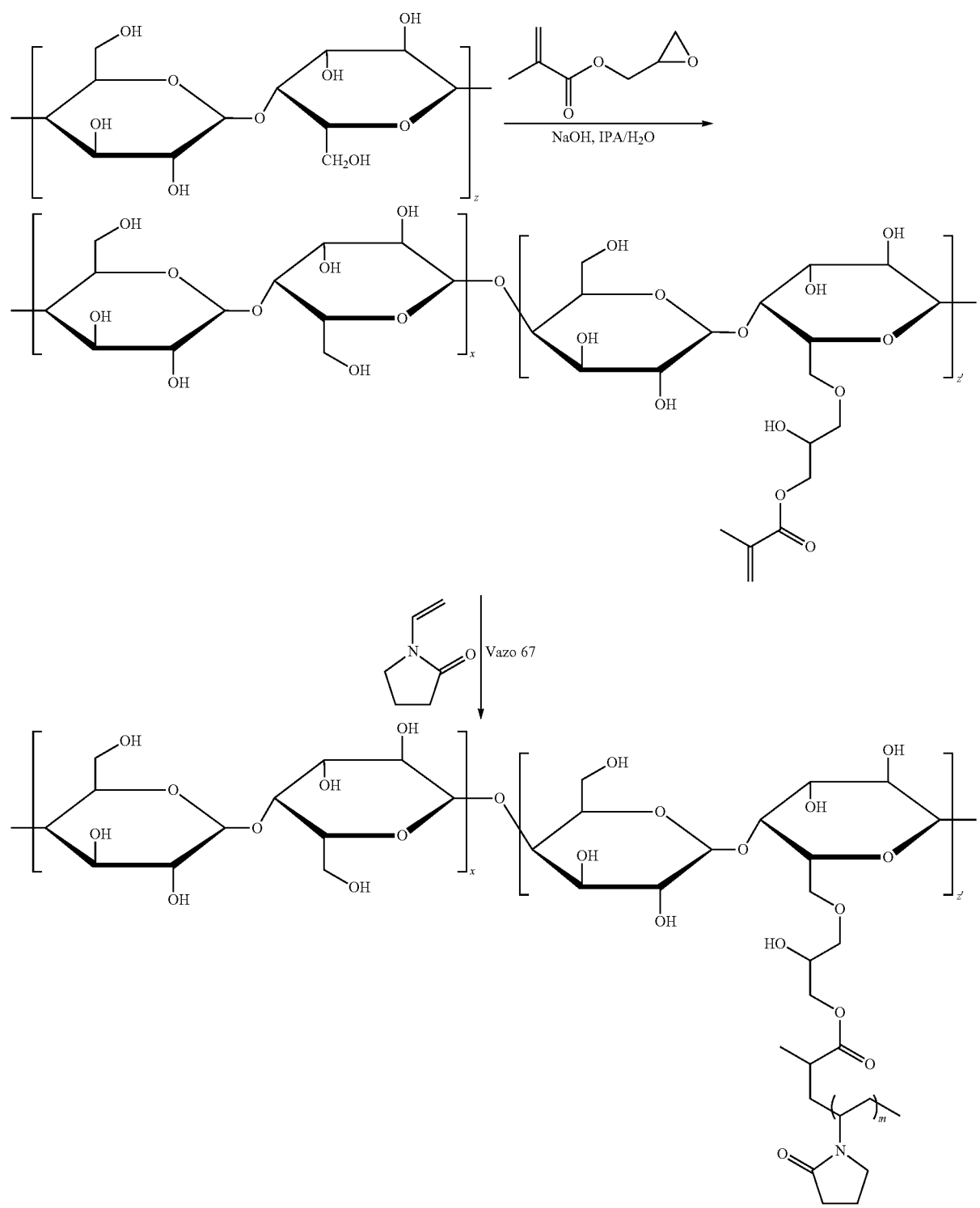

In a 1-L reactor equipped with thermocouple, nitrogen inlet and reflux condenser, 50 g Celluosize HEC-15 powder (from Dow), 20 g DI water and 200 g isopropyl alcohol (IPA) were added. The reaction mixture was stirred overnight at room temperature. Then, 10 g NaOH aqueous solution (50%) was added into the reactor and the reaction temperature was raised to 70° C. When the temperature reached 70° C., 8.5 g GMA was charged into the reactor and reactor was sparged with air. After 5.5 hours of reaction, air sparging was switched to nitrogen sparging. After 30 minutes, 41.5 g HPVP was added into the reactor followed by 0.18 g Vazo 67 (dissolved in 1 g of IPA). Fifteen minutes later one more shot of Vazo 67 (0.18 g Vazo 67 in 1 g IPA) was added into the reactor. The reaction was maintained at 70° C. for 8.5 hrs. Then, 0.6 g Vazo 67 (dissolved in 4 g IPA) was added. After 4 hours of reaction, the reaction was stopped and cooled down to room temperature. The reaction mixture was washed with acetone, filtered, and dried in vacuum oven at 50° C. The product obtained was a yellowish powder with a yield of 65.5%.

Example 21

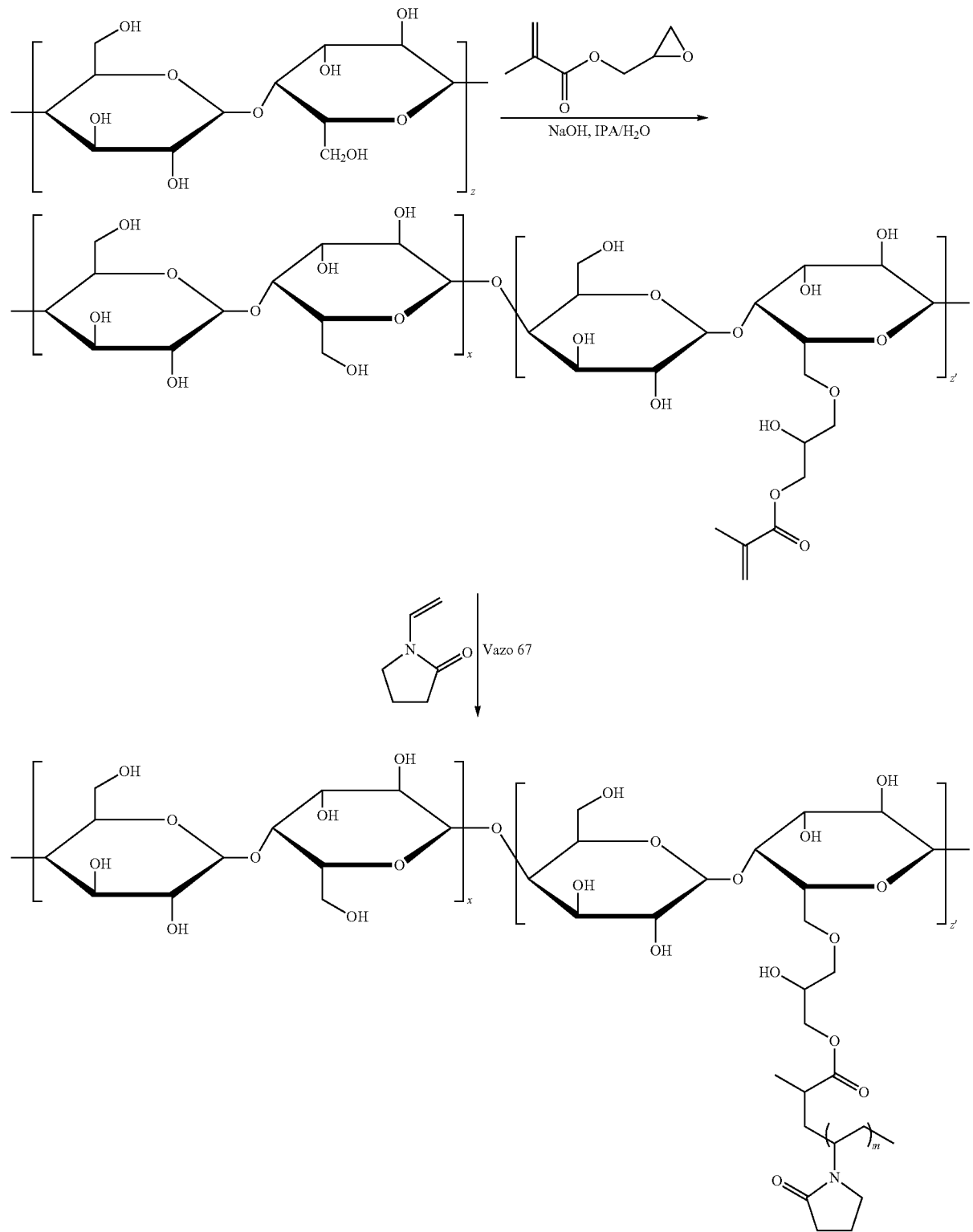

In a 1-L reactor was equipped with thermocouple, nitrogen inlet and reflux condenser, 48 g of Celluosize HEC-15 powder (from Dow), 30 g DI water and 170 g isopropyl alcohol (IPA) were added. The reaction mixture was stirred overnight at room temperature. Then, 1.5 g GMA and 2.0 g NaOH aqueous solution (50%) were added into the reactor. The reaction temperature was raised to 70° C. and maintained for 6 hours. GMA was not detected by GC. Then, HPVP (50.0 g) was added into the reactor and reaction mixture was sparged with nitrogen for 30 minutes. When the temperature was stabilized at 70° C., 0.8 g Trigonox 25 C75 was added into the reactor. The reaction mixture was kept for 6 hours then cooled to room temperature to discharge. After being dried in a vacuum oven, a yellowish powder was obtained. The product was readily soluble in water and the solution obtained was clear.

Example 22

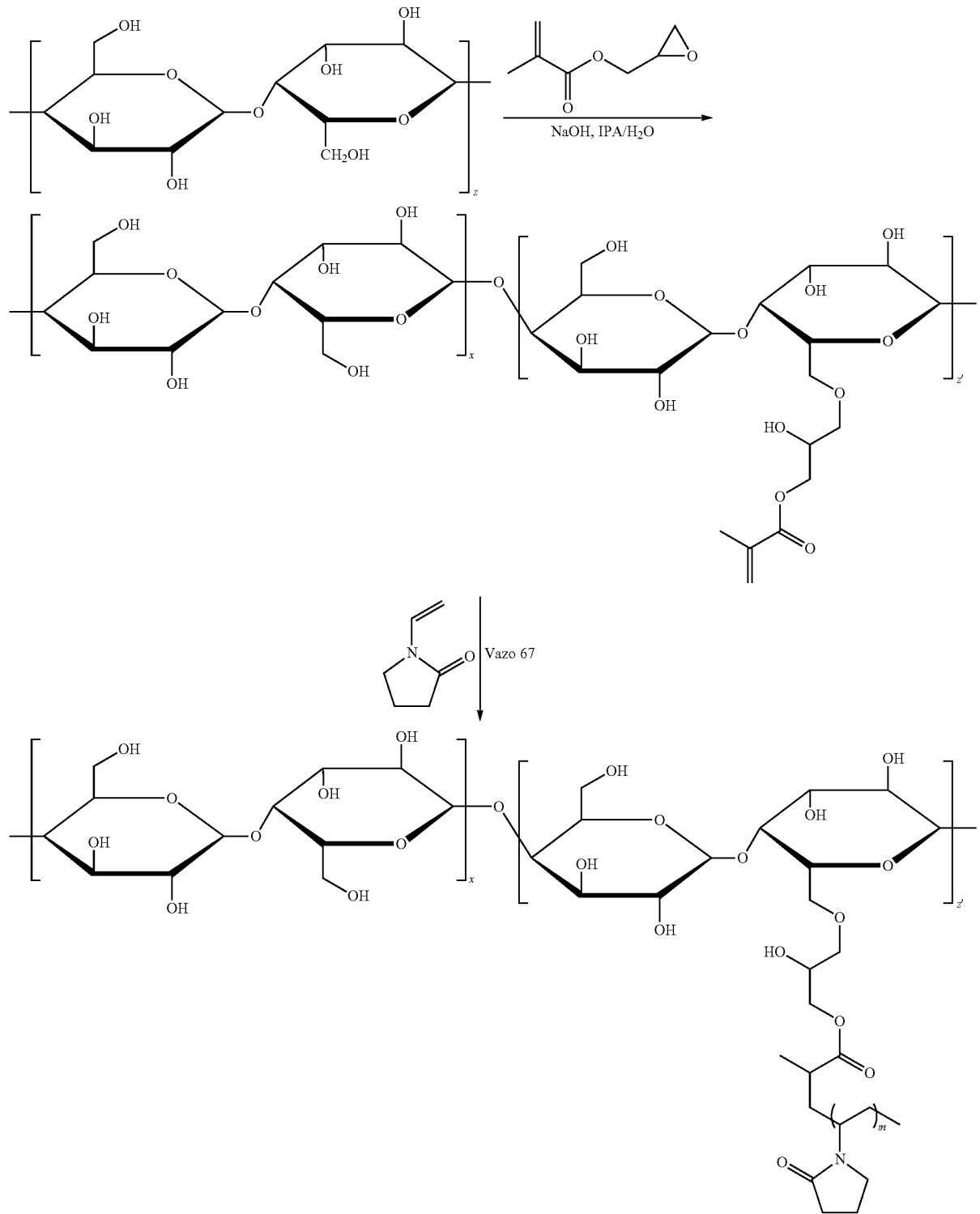

PVP/VA/GMA polymer was first synthesized by solution polymerization. In a 1-L Parr reactor. Vinyl acetate (VA, 10 g) and 230 g Acetone were added. The reactor was pressurize/release with nitrogen three times and then heated to 55° C. with vigorous stirring. A monomer feeding solution was prepared by mixing HPVP (70 g) and Vinyl Acetate (30 g). An initiator solution was prepared by mixing 0.83 g Trigonox 25 C75 with 4.17 g Acetone. When temperature reached 55° C., the monomer feeding solution was metered into the reactor over 1 hour. Meanwhile four shots of Trigonox 25 C75 solution were added every half hours. The reaction was maintained for 3 hours and then was increased to 65° C. Two more shots of Trigonox 25 C75 were added every 2 hours. After the final shots of Trigonox 25 C75, the reaction was hold for another three hours. The residual VP % and VA % in the obtained product were less than 0.1%.

In a 1-L kettle reactor was equipped with thermocouple, nitrogen inlet and reflux condenser, 25 g Celluosize HEC-15 powder (from Dow) and 100 g Acetone and 25 g Dimethylsulfonate (DMSO) were added. The reaction mixture was stirred overnight at room temperature. 50 g P(VP/VA/GMA) (30% solids) was added into the reactor followed by 0.58 g KOH powder. Reaction mixture was refluxed for 6 hours and then was cooled to room temperature to discharge the product. The reaction mixture was washed by acetone three times and the precipitate was dried in oven. The product obtained was a yellowish powder with a yield of 68.75%.

Example 23

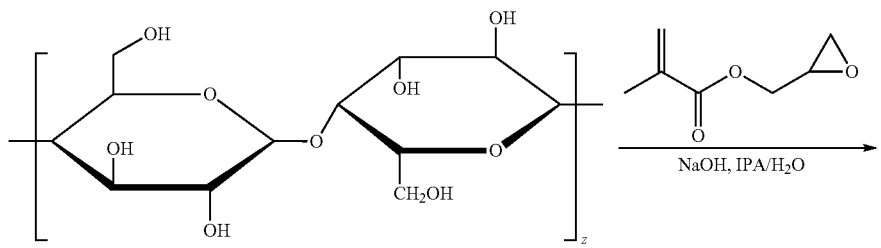

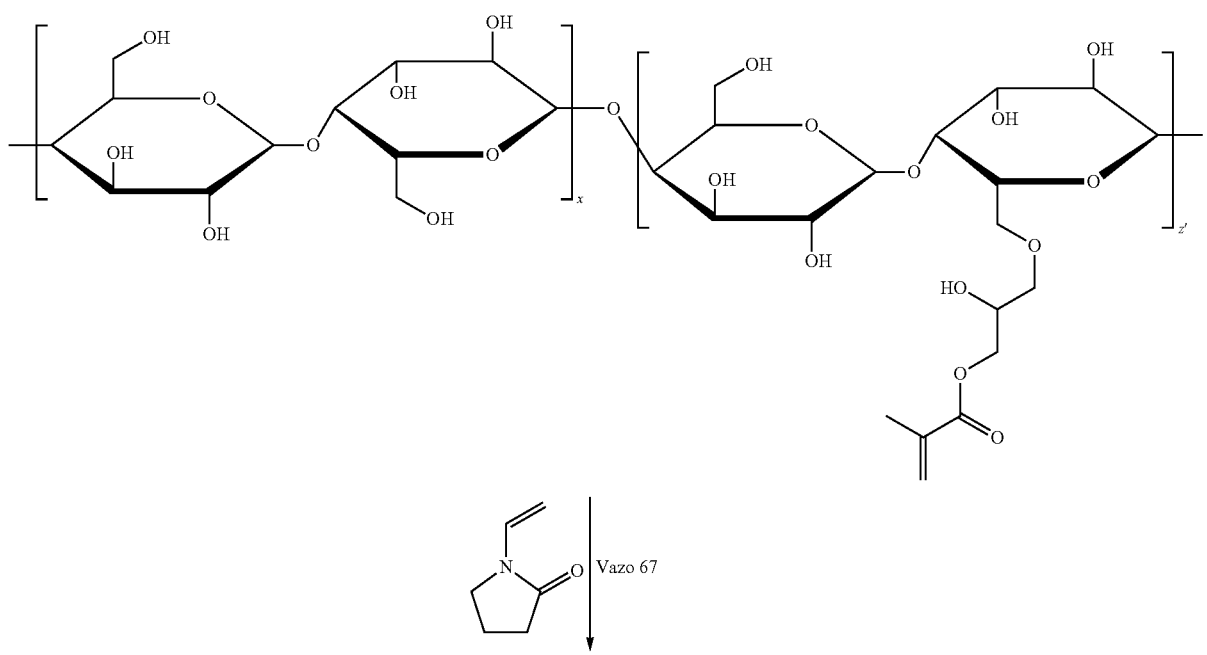

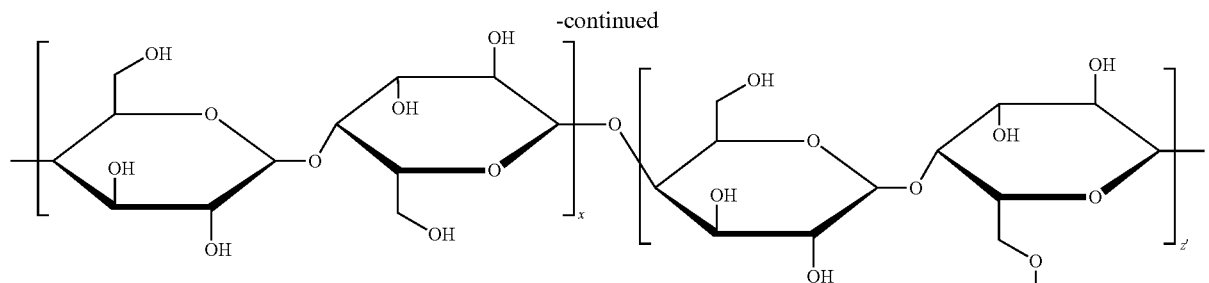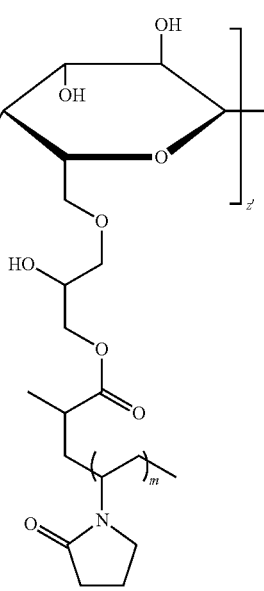

In a 1-L reactor was equipped with thermocouple, nitrogen inlet and reflux condenser, 48.5 g Celluosize HEC-15 powder (from Dow), 30 g DI water and 170 g isopropyl alcohol (IPA) were added. The reaction mixture was stirred overnight at room temperature. The reaction mixture was heated to 50° C. and then 2.0 g NaOH aqueous solution (50%) was added. After 2 hours of reaction, 1.5 g GMA was added to the reactor. The reaction temperature was raised to 70° C. and maintained for 5 hours. Then, the reaction mixture was cooled to 50° C. and HPVP (50.0 g) was added into the reactor. The reactor was sparged with nitrogen for 30 minutes and then 0.5 g Trigonox 25 C75 was added. The reaction was maintained for 1 hour and then was raised to 60° C. One hour later, the reaction mixture was increased to 70° C. and held for 3.5 hours. Two more shots of 0.2 g Trigonox 25 C75 were added into the reactor after 2 hours. The residual VP of the final product was 0.1%.

Example 24

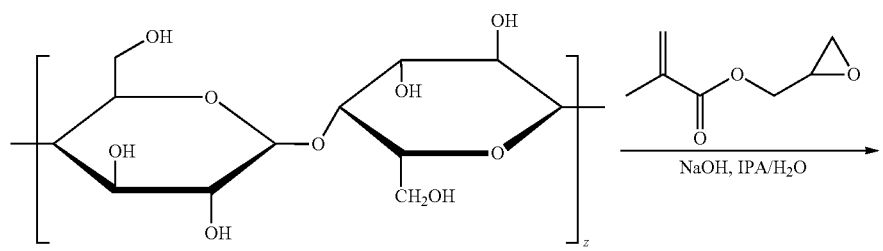

-continued

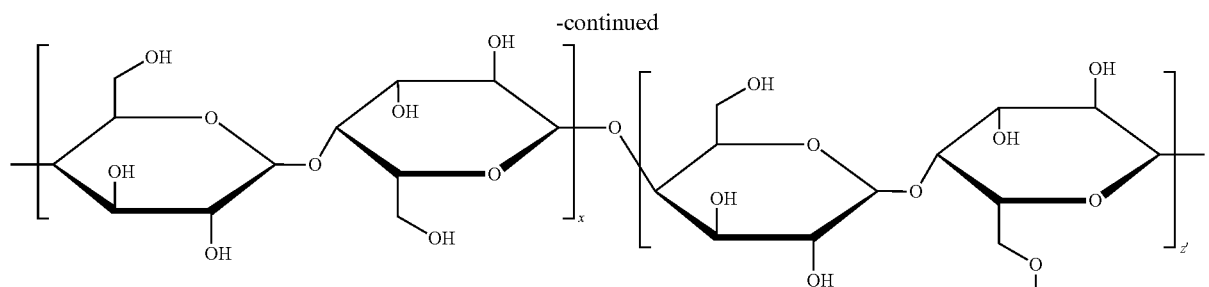

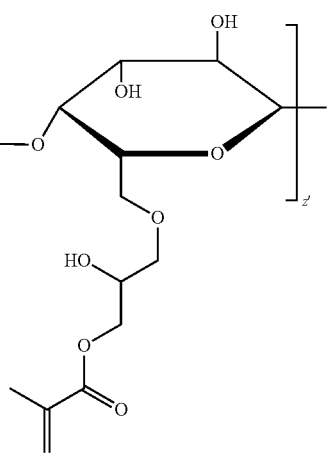

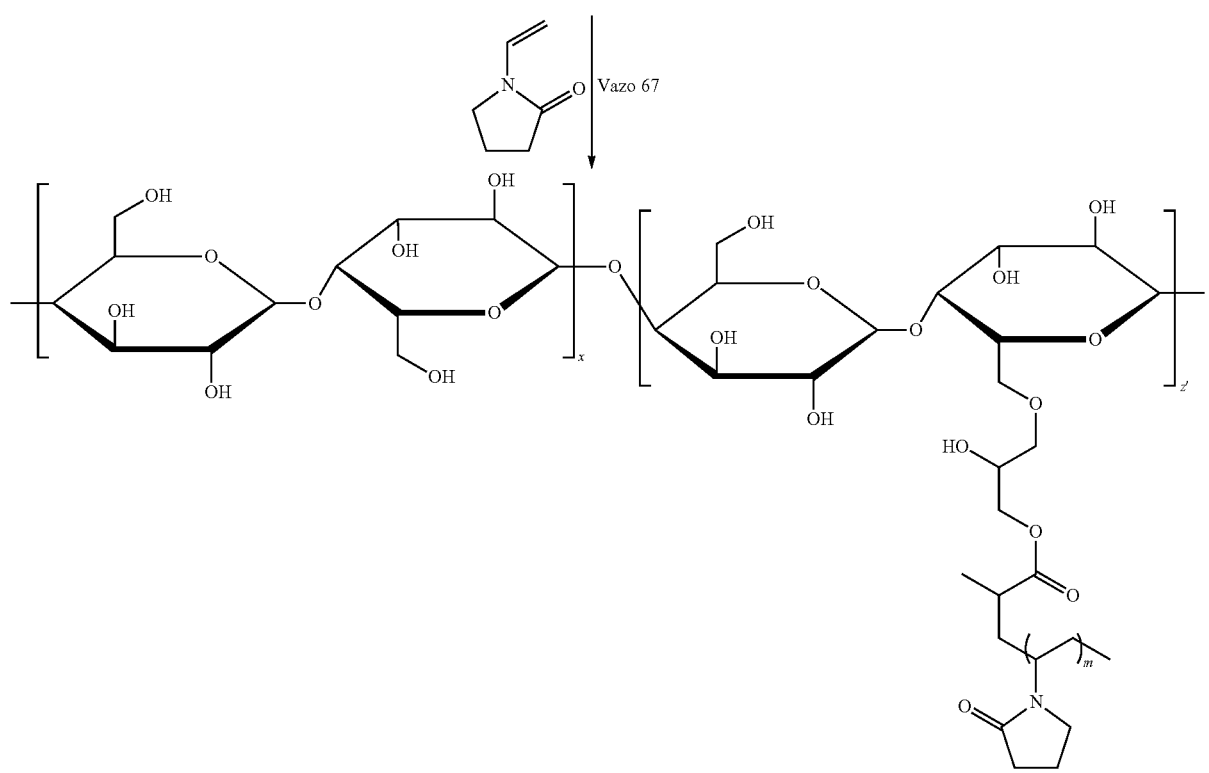

The method of Example 5 was followed with the following change: solvent exchange was applied to replace IPA with water. The final obtained was 16% solids in water.

Example 24

Shale Swelling Inhibition Testing

The shale swelling inhibition performance was evaluated using the Roller Oven test. The test procedures are following:

1). Prepare 400 g of the polymer solution to be evaluated.
2). Weigh the required amount of polymer solution and water into a 500 ml glass bottle with lid.
3). Add 40 g of KCl and heat with stirring to 71° C. (160° F.).
4). Add 10 g (to 2 decimal places) of the 2-4 mm London clay to the test fluid and record weight.
5). Screw on the bottle cap and shake the sample by hand for 10 seconds.
6). Place the bottle on the roller mixer with the IR lamp at 20 r/min and leave for 16 hours.
7). Remove from the mixer and heat and allow to cool for 1 hour. Pour the contents of the bottle into a 500 μm sieve, retaining the clay and disposing of the test fluid.
8). Rinse the bottle with water and pour onto the sieve until all the shale has come out of the bottle.
9). Wash the shale in the sieve by immersing in a tray of water.
10). Dry sieve and contents at 121° C. to constant weight
11). Weigh the dried shale and report as a percentage of the original 10 g.

The shale recovery is determined by the formula:

$$\text{Shale Recovery \%} = \frac{\text{Weight recovered shale}}{\text{Weight of the Original Shale}} \times 100\%$$

The performance (inhibition efficiency) is shown by (shale recovery rate), solution appearance after hot rolled, and change of the clay particle size. A good shale swelling inhibitor will give a higher shale recovery value and the test solution, after being rolled in a roller oven for 16 hrs, will be less muddy. Recovered clay particles for a good shale swelling inhibitor do not change greatly before and after the test.

Example 25

Salt Tolerance Test

The salt tolerance of a shale swelling inhibitor was evaluated using the following procedure:
1). Prepare 10.26% KCl solution by dissolving a KCl powder into DI water in a glass jar.
2). Add polymer into the 10.26 KCl aqueous solution to make 1% polymer solution.
3). Transfer the polymer solution prepared above to a glass made pressure tube.
4). Pre-set an oven to 120° C.
5). Leave the pressure tube in the oven for overnight
6). Observe the appearance of the solution.

Salt tolerance of shale swelling inhibitor is determined by the appearance of test solutions. Polymers that have good salt tolerance do not precipitate out of solution.

Example 26

Shale Swelling Inhibition and Salt tolerance Test Results

| Sample ID | Active level % | Shale Recovery Rate % | Solution appearance | Appearance of salt tolerance test solution |
|---|---|---|---|---|
| Blank | 0 | 25%-40% | Muddy | — |
| PVA | 0.6 | 57.2 | Muddy | Clear |
| Crosslinked PVP | 0.33 | 100% | Hazy | Phase separation |
| Exp 1 | 0.33 | 101.5% | Clear slightly hazy | Clear, no phase separation |
| Exp 2 | 0.33 | 98.5% | Clear slightly hazy | Clear, no phase separation |
| Exp 8 | 0.33 | 92 | Slightly muddy | Slightly hazy, no precipitation |
| Exp 9 | 0.33 | 98.5% | Clear, slightly hazy | Slightly hazy no precipitation |
| Exp 10 | 0.33 | 101.5% | Clear, slightly hazy | Clear, no precipitation |
| Exp 11 | 0.33 | 101.8% | Clear, | Clear, no precipitation |
| Exp 12 | 0.33 | 95.5 | Slightly muddy | Clear, no precipitation |
| Exp 13 | 0.33 | 98.1 | Slightly muddy | Clear, no precipitation |
| Exp 14 | 0.33 | 100 | Clear, slightly hazy | Clear, no precipitation |
| Exp 15 | 0.33 | 95.4-98.5 | Slightly muddy | Clear, no precipitation |
| Exp 17 | 0.33 | 92 | Muddy | precipitation |
| Exp 21 | 0.6 | 90.1-95.5 | Muddy | — |
| Exp 22 | 0.6 | 95.5 | Muddy | — |
| Exp 23 | 0.6 | 98.1 | Muddy | — |
| Exp 24 | 0.6 | 100 | Clear, slightly hazy | — |

While a number of embodiments of this invention have been represented, it was apparent that the basic construction may be altered to provide other embodiments that utilize the invention without departing from the spirit and scope of the invention. All such modifications and variations are intended to be included within the scope of the invention as defined in the appended claims rather than the specific embodiments that have been presented by way of example.

We claim:
1. An amidic polymer comprising a (a) polymer having a hydroxyl group reacted with a (b) compound having an epoxy group and an unsaturated moiety to provide a reactive unsaturated intermediate polymer; wherein the reactive unsaturated intermediate polymer is further reacted with a (c) vinyl amide to provide the amidic polymer, wherein the hydroxyl group of the (a) polymer reacts with the epoxy group of the (b) compound and the unsaturated moiety of the (b) compound reacts with the vinyl moiety of the (c) vinyl amide to form a new carbon-carbon bond.

2. The amidic polymer according to claim 1, wherein the (a) polymer having a hydroxyl group is selected from the group consisting of a partially hydrolyzed poly(vinyl acetate), a poly(vinyl alcohol), a polysaccharide, and mixtures thereof.

3. The amidic polymer according to claim 2, wherein the polysaccharide is derived from a cellulose, a hydroxyethyl cellulose, a carboxymethyl cellulose, a hydroxyethyl cellulose, a hydropropyl cellulose, a hydroxypropyl methyl cellulose, an ethyl cellulose, a carrageenan, a chitosan, a chondroitin sulfate, a heparin, a hyaluronic acid, a starch, a chitin, a perctin, a guar, a xanthan, a dextran, a welan gum, a gellan gum, a diutan, a pullulana, or a combination thereof.

4. The amidic polymer according to claim 1, wherein the (b) compound having an epoxy group and an unsaturated moiety is selected from the group consisting of a glycidyl methacrylate, a glycidyl acrylate], a glycidyl ethyl acrylate, a allyl glycidyl ether, a glycidyl methacrylamide, a glycidyl ethylacrylamide, a glycidyl acrylamide, and mixtures thereof.

5. The amidic polymer according to claim 1, wherein the (c) vinyl amide is selected from the group consisting of N-vinyl pyrrolidone; N-vinyl piperidone; N-vinyl caprolactam; N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N vinyl-4-isopropyl caprolactam; N-vinyl-5-isopropyl caprolactam; N-vinyl-4-butyl caprolactam; N-vinyl formamide; N-vinyl acetamide; N-(2,2-dichloro-vinyl)-propionamide; N-ethenyl acetamide; cis-N-propenyl acetamide; N-vinyl-N-methyl acetamide; N-vinyl-N,N-propyl propionamide; N-acryloyl piperidone; N-acryloyl pyrrolidone; ethyl acryloyl pyrrolidone; methyl acryloyl pyrrolidone; N-acryloyl caprolactam; ethyl acryloyl caprolactam; methyl acryloyl caprolactam; N-cyclohexylacrylamide; N-cyclopentylacrylamide; acrylamide, N-butoxymethylacrylamide; N,N-dibutylacrylamide; N-butylacrylamide; diacetoneacrylamide; N—(N,N-dimethylamino)ethyl acrylamide; N,N-diethylacrylamide; N,N-dimethylacrylamide; N-dodecylmethacrylamide; N-ethylacrylamide; N-ethylmethacrylamide; N-isopropylacrylamide; N-isopropylmethacrylamide; β,β-N,N-tetramethylacrylamide; N-methylolacrylamide; N-methyl acrylamide; N-octadecylacrylamide; N-octylacrylamide; N-phenylacrylamide; trichloroacrylamide; and mixtures thereof.

6. The amidic polymer according to claim 1, wherein the polymer is represented by the structure:

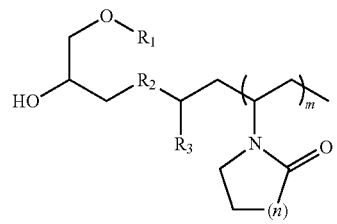

wherein $R_1$ is derived from a polymer having a hydroxyl group; $R_2$ is selected from the group consisting of —O—(C=O)—, —O—C—, and —NH—(C=O)—; $R_3$ is selected from the group consisting of hydrogen and a $C_1$-$C_4$ alkyl group; n is an integer ranging from 1 to 3; and m is an integer ranging from 1 to about 1,000,000.

7. The amidic polymer according to claim 6, wherein $R_1$ is derived from a polymer having a hydroxyl group selected from the group consisting of a partially hydrolyzed poly(vinyl acetate), a poly(vinyl alcohol), a polysaccharide, and mixtures thereof.

8. The amidic polymer according to claim 7, wherein the polysaccharide is derived from a cellulose, a hydroxyethyl cellulose, a carboxymethyl cellulose, a hydroxyethyl cellulose, a hydropropyl cellulose, a hydroxypropyl methyl cellulose, an ethyl cellulose, a carrageenan, a chitosan, a chondroitin sulfate, a heparin, a hyaluronic acid, a starch, a chitin, a perctin, a guar, a xanthan, a dextran, a welan gum, a gellan gum, a diutan, a pullulana, or a combination thereof.

9. The amidic polymer according to claim 6, wherein $R_2$ is —O—(C=O)—.

10. The amidic polymer according to claim 6, wherein $R_3$ is hydrogen or methyl.

11. The amidic polymer according to claim 6, wherein n is an integer ranging from 1 to 2.

12. The amidic polymer according to claim 6, wherein m is an integer ranging from 1 to about 750,000.

13. The amidic polymer according to claim 6, wherein the polymer is selected from the group of structures consisting of:

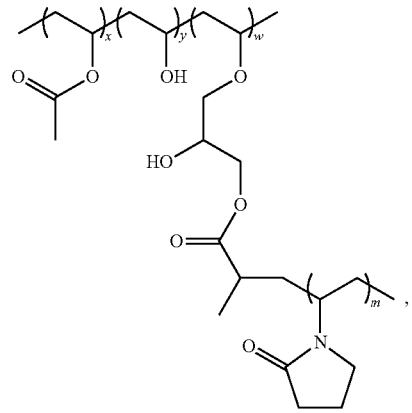
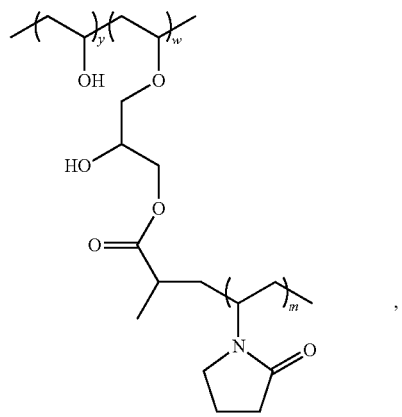

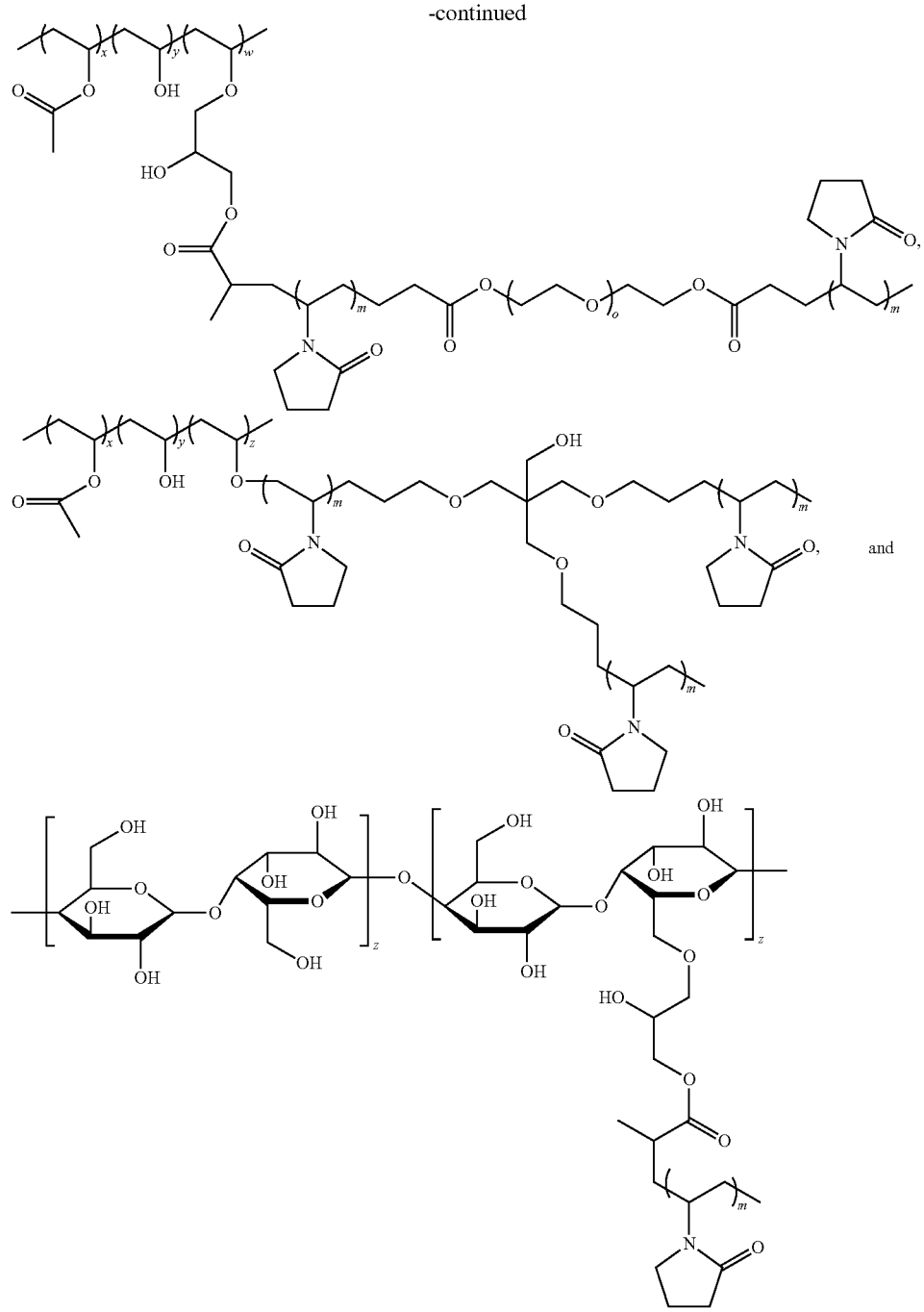
wherein x is an integer ranging from 1 to about 1,000,000; y is an integer ranging from 1 to about 1,000,000; w is an integer ranging from 1 to about 1,000,000; o is an integer ranging from 1 to about 1,000,000; and z is an integer ranging from 1 to about 1,000,000.
* * * * *